United States Patent
Palermo et al.

(10) Patent No.: US 12,542,604 B2
(45) Date of Patent: Feb. 3, 2026

(54) MULTI-ORBIT SATELLITE DATA CENTER

(71) Applicant: Intel Corporation, Santa Clara, CA (US)

(72) Inventors: Stephen T. Palermo, Chandler, AZ (US); Valerie J. Parker, Portland, OR (US); Udayan Mukherjee, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 227 days.

(21) Appl. No.: 18/111,382

(22) Filed: Feb. 17, 2023

(65) Prior Publication Data

US 2023/0208510 A1    Jun. 29, 2023

Related U.S. Application Data

(60) Provisional application No. 63/312,318, filed on Feb. 21, 2022.

(51) Int. Cl.
*H04B 7/185*    (2006.01)
*H04W 84/06*    (2009.01)

(52) U.S. Cl.
CPC ..... *H04B 7/18521* (2013.01); *H04B 7/18591* (2013.01); *H04W 84/06* (2013.01)

(58) Field of Classification Search
CPC .......... H04B 7/188521; H04B 7/18528; H04B 7/18563; H04B 7/18578; H04B 7/18591; H04W 84/06
See application file for complete search history.

(56) References Cited

U.S. PATENT DOCUMENTS

| | | | | |
|---|---|---|---|---|
| 9,397,745 | B2 * | 7/2016 | Jalali | H04B 7/18584 |
| 9,763,167 | B2 * | 9/2017 | Gopal | H04W 40/02 |
| 9,787,392 | B2 * | 10/2017 | Baudoin | H04W 40/14 |
| 10,348,396 | B2 * | 7/2019 | Olson | H04W 84/06 |
| 10,433,208 | B2 * | 10/2019 | Gopal | H04B 7/18519 |
| 10,903,899 | B2 * | 1/2021 | Baudoin | H04B 7/18519 |
| 2010/0039984 | A1 * | 2/2010 | Brownrigg | H04B 7/18584 370/316 |
| 2012/0236748 | A1 * | 9/2012 | Brownrigg | H04B 7/18506 370/252 |

(Continued)

FOREIGN PATENT DOCUMENTS

| | | |
|---|---|---|
| WO | 2021221736 | 11/2021 |
| WO | 2021221842 | 11/2021 |

OTHER PUBLICATIONS

Chen, Chao, "Advanced Routing Protocols for Satellite and Space Networks", School of Electrical and Computer Engineering Georgia Institute of Technology, (May 2005), 158 pgs.

*Primary Examiner* — Alpus Hsu
(74) *Attorney, Agent, or Firm* — Schwegman Lundberg & Woessner, P.A.

(57) ABSTRACT

Various approaches for the deployment and coordination of network operation processing, compute processing, and inter-satellite communication coordination, within one or multiple satellite non-terrestrial networks, are discussed. Among other examples, a data center located at one or more satellites operating in a middle Earth orbit (MEO) plane, geosynchronous orbit (GEO) plane, or high-Earth elliptical orbit (HEO) plane, may be used to provide network and data processing operations for a low-Earth orbit (LEO) constellation.

20 Claims, 26 Drawing Sheets

(56) References Cited

U.S. PATENT DOCUMENTS

| | | | | |
|---|---|---|---|---|
| 2018/0376392 A1* | 12/2018 | Wu | ............................ | H04L 5/26 |
| 2018/0376393 A1* | 12/2018 | Wu | .................... | H04B 7/18521 |
| 2021/0218676 A1* | 7/2021 | Chandran | ............. | H04W 48/18 |
| 2022/0094431 A1* | 3/2022 | Kaen | ......................... | H04B 7/19 |
| 2022/0200693 A1* | 6/2022 | Karlsson | ............ | H04B 7/18506 |
| 2022/0345210 A1 | 10/2022 | Palermo et al. | | |
| 2022/0368622 A1* | 11/2022 | Rosenberg | .............. | H04L 45/14 |
| 2023/0059412 A1* | 2/2023 | Ravishankar | ........ | H04B 10/118 |
| 2023/0156826 A1* | 5/2023 | Palermo | ............. | H04B 7/18517 |
| | | | | 370/329 |

\* cited by examiner

MULTI-ORBIT SATELLITE DATA CENTER

PRIORITY CLAIM

This application claims the benefit of priority to U.S. Provisional Patent Application No. 63/312,318, filed Feb. 21, 2022, and titled "MULTI-ORBIT SATELLITE DATA CENTER", which is incorporated herein by reference in its entirety.

TECHNICAL FIELD

Embodiments described herein generally relate to data processing and network communication scenarios involved with satellite-based networking, such as with the use of inter-satellite communications, communication paths, network operation coordination, and data center deployments in space.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

OVERVIEW

Figure 1:
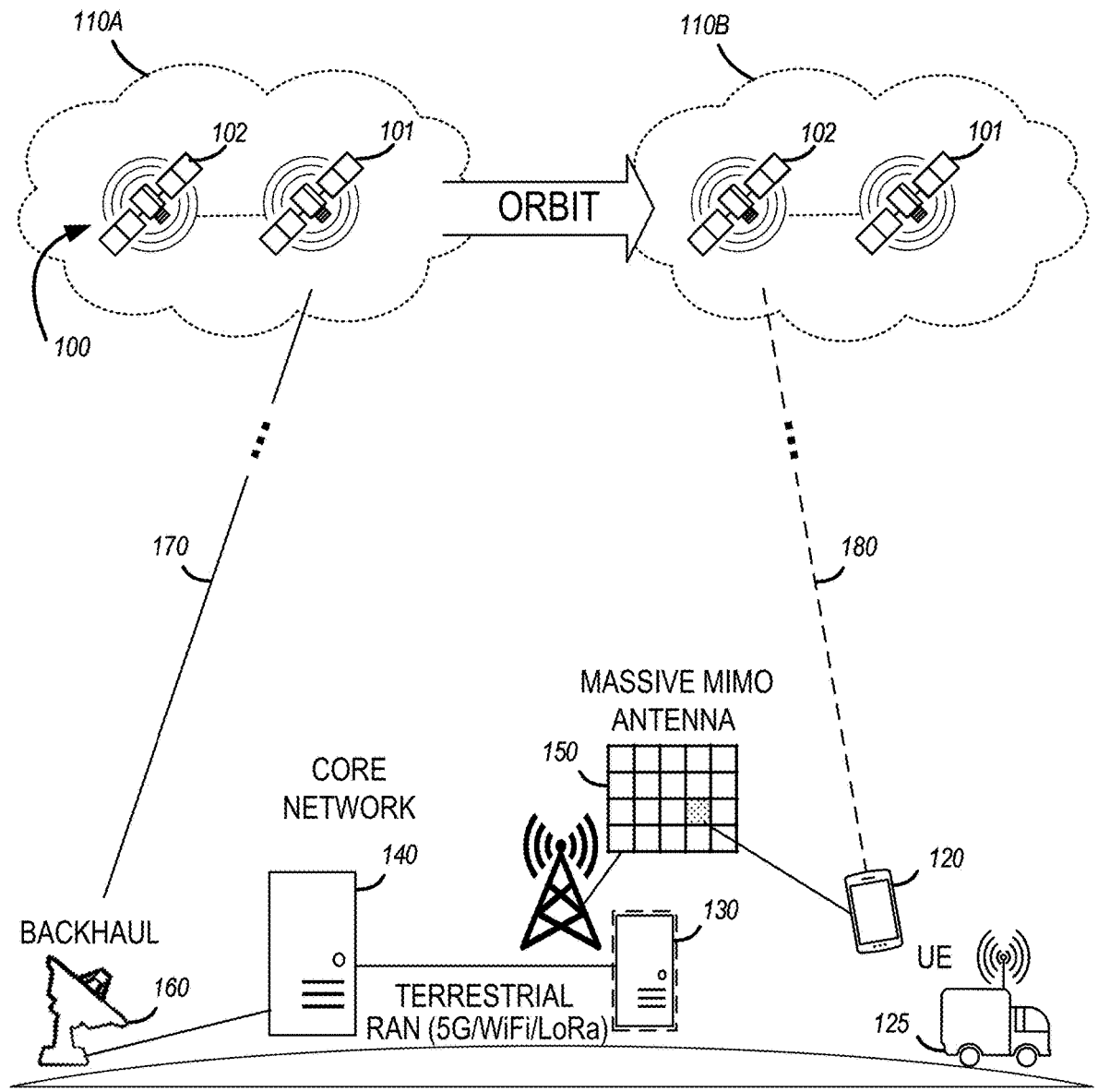
FIG. 1 illustrates network connectivity in non-terrestrial (satellite) and terrestrial (e.g., mobile cellular network) settings, according to an example.

The following disclosure addresses aspects of data processing that is relevant to non-terrestrial (satellite) networks. Today, most low latency communication satellite constellations use Earth-based servers to prepare and establish constellation payload routing and control instructions. These pre-determined routing tables and control instructions are uploaded to a constellation to schedule future contacts that include short data bursts or continuous connections. For instance, Telemetry Tracking and Control (TTAC) installations are used to upload routing tables and control instructions and obtain current constellation heath for future processing.

Routing calculations including inter-satellite links and exclusion zone (or inclusion zone) definitions depend on compute resources sufficient to schedule customer contact within the current state of the constellation. Some types of satellite compute resources are limited and power intensive, so many calculations are pre-formed on Earth and uploaded to the satellite constellation. More active constellations may use more complicated and frequent calculations. For instance, some satellite constellations or groups of constellations use many (e.g., hundreds, thousands) of satellites to provide global coverage but may have limited processing capabilities on individual devices. The deployment of more satellites has led to the additional uses of network operation centers for on-demand and localized re-routing.

Disclosed herein is an architecture to perform routing and control calculations in-orbit using compute that is coordinated among satellites in multi-orbit hieratical orbital planes, and as is directed by ground-based compute processing. LEO satellites have the least amount of processing power, but lower latencies require thousands of LEO satellites close to Earth. LEO satellites need to be simple to reduce costs especially since battery and thruster life is low because of many orbital adjustments caused by Earth's gravitational pull and solar storm damage. These limited satellite capabilities require routing that is computed by other more capable compute nodes (e.g., on-earth). Thus, the following approaches include the use of higher-than-LEO orbit satellite constellations—having more processing power—to offload and handle some of the Earth-based processing. Such approaches keep the same LEO constellation arrangements and, under certain conditions, transfers control and compute to more capable and fewer higher-orbit satellites.

In an example, inter-satellite links from high Earth orbit (HEO) (also referred to as high elliptical orbit) and/or geostationary orbit (GEO) (also referred to as geosynchronous orbit) and/or medium Earth orbit (MEO) orbital planes establish a connected data center in-orbit. Cross-orbit satellite links that bridge between MEO←→HEO←→GEO←→LEO orbits provide the connectivity to perform TTAC capabilities in-orbit. Thus, in some examples, instead of having Earth-based calculations uplinked to a LEO constellation via a TTAC, the higher-orbit data center performs the same calculations and "downloads" the calculations to the LEO constellation. This accordingly reduces interference from earth to LEO orbit and enables a faster space-based solution that is able to react to real-time events.

Additionally, the following techniques enable advanced processing scenarios for redundancy, coordination, and management of non-terrestrial compute. In-orbit data centers also enable space-originated artificial intelligence and machine learning (AI and ML) data processing capabilities as well as other space-centric calculations and processing. Because space is a vacuum, inter-orbit satellite links can use optical (laser) or higher frequency bands such as V-band with limited interference to quickly communicate the results of compute processing. Moreover, in this fashion, the data center or network operation center can operate in the same fashion as a Satellite NodeB or gNodeB.

Overview of Non-Terrestrial Network Configurations

FIG. 1 illustrates network connectivity in non-terrestrial (satellite) and terrestrial (e.g., mobile cellular network) settings, according to an example. As shown, a satellite constellation 100 (the constellation depicted in FIG. 1 at orbital positions 110A and 110B) may include multiple satellite vehicles (SVs) 101 and 102, which are communicatively connected to each other and to one or more terrestrial networks. The individual satellites in the constellation 100 (each, an SV) conduct an orbit around the Earth, at an orbit speed that increases as the SV is closer to Earth. LEO constellations are generally considered to include SVs that orbit at an altitude between 160 and 1000 km; at this altitude, each SV orbits the Earth about every 90 to 120 minutes.

The constellation 100 includes individual SVs 101 and 102 (and numerous other SVs not shown), and uses multiple SVs to provide communications coverage to a geographic area on Earth. The constellation 100 may also coordinate with other satellite constellations (not shown), and with terrestrial-based networks, to selectively provide connectivity and services for individual devices (user equipment) or terrestrial network systems (network equipment).

In this example, the satellite constellation 100 is connected via a satellite link 170 to a backhaul network 160, which is in turn connected to a 5G core network 140. The 5G core network 140 is used to support 5G communication operations with the satellite network and at a terrestrial 5G radio access network (RAN) 130. For instance, the 5G core network 140 may be located in a remote location, and use the satellite constellation 100 as the exclusive mechanism to reach wide area networks and the Internet. In other scenarios, the 5G core network 140 may use the satellite constellation 100 as a redundant link to access the wide area networks and the Internet; in still other scenarios, the 5G core network 140 may use the satellite constellation 100 as an alternate path to access the wide area networks and the Internet (e.g., to communicate with networks on other continents).

FIG. 1 additionally depicts the use of the terrestrial 5G RAN 130, to provide radio connectivity to a user equipment (UE) such as user device 120 or vehicle 125 on-ground via a massive MIMO antenna 150. It will be understood that a variety of 5G and other network communication components and units are not depicted in FIG. 1 for purposes of simplicity. In some examples, each UE 120 or 125 also may have its own satellite connectivity hardware (e.g., receiver circuitry and antenna), to directly connect with the satellite constellation 100 via satellite link 180. Although a 5G network is depicted and discussed at length in the following sections, it will be apparent that other variations of 3GPP, O-RAN, and other network standard implementations may also be applicable.

Other permutations (not shown) may involve a direct connection of the 5G RAN 130 to the satellite constellation 100 (e.g., with the 5G core network 140 accessible over a satellite link); coordination with other wired (e.g., fiber), laser or optical, and wireless links and backhaul; multi-access radios among the UE, the RAN, and other UEs; and other permutations of terrestrial and non-terrestrial connectivity. Satellite network connections may be coordinated with 5G network equipment and user equipment based on satellite orbit coverage, available network services and equipment, cost and security, and geographic or geopolitical considerations, and the like. With these basic entities in mind, and with the changing compositions of mobile users and in-orbit satellites, the following techniques describe ways in which terrestrial and satellite networks can be extended for various edge computing scenarios.

Figure 2:
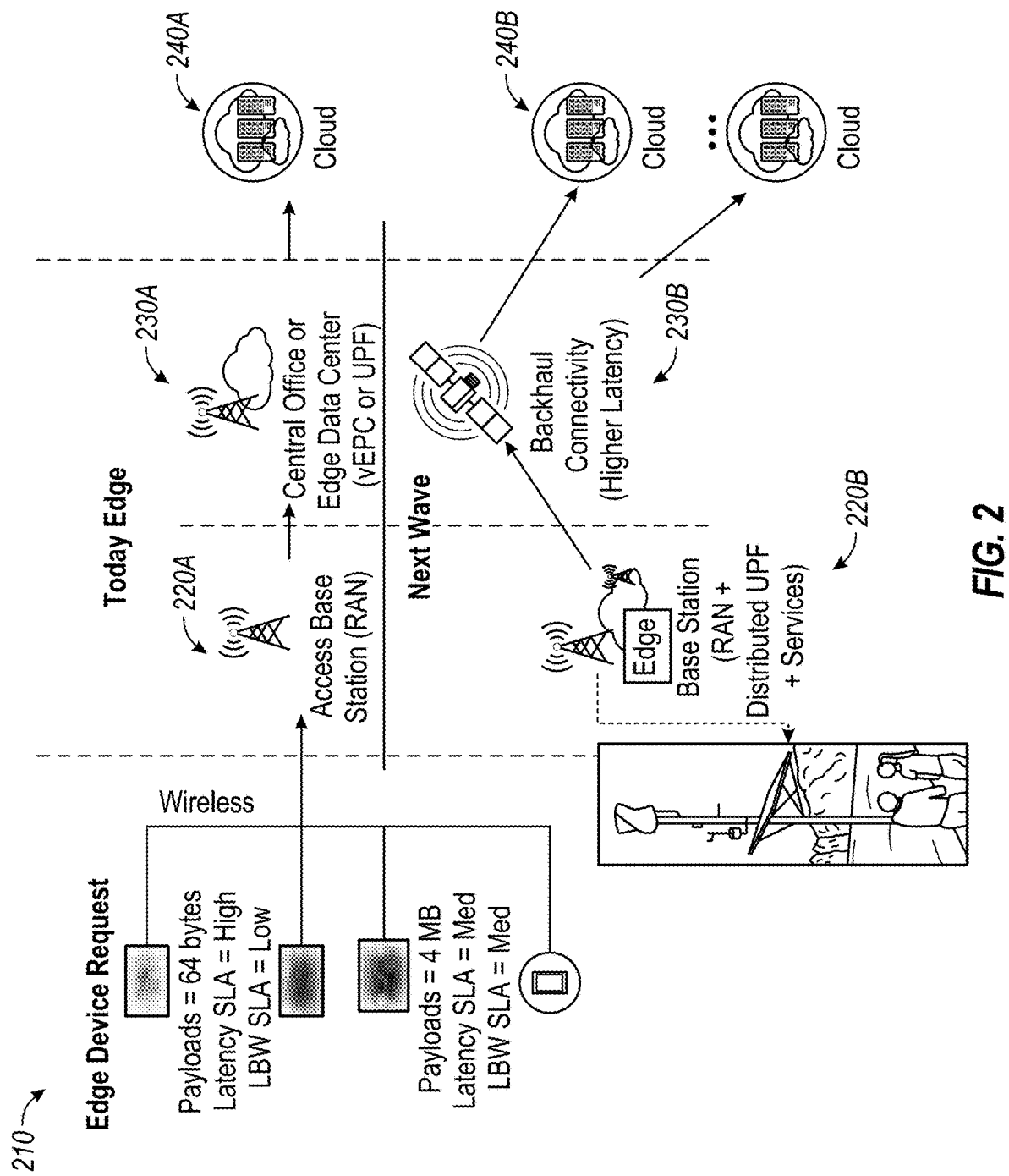
FIG. 2 illustrates terrestrial and non-terrestrial edge connectivity architectures, according to an example.

FIG. 2 illustrates terrestrial and non-terrestrial edge connectivity architectures. Edge cloud computing has already been established as one of the next evolutions in the context of distributed computing and democratization of compute. Current edge deployments typically involve a set of devices 210 or users connected to access data points 220A (base stations, small cells, wireless or wired connectivity) that provide access to a set of services (hosted locally on the access points or other points of aggregations) via different type of network functions 230A (e.g., virtual Evolved Packet Cores (vEPCs), User Plane Function (UPF), virtual Broadband Network Gateway (vBNG), Control Plane and User Plane Separation (CUPS), Multiprotocol Label Switching (MPLS), Ethernet etc.). Multiple constellation of satellites that act as different organizations have a significant need to work together, share resources, and offer features such as geographic exclusion zones, quality of service (QoS), and low-latency content and service delivery.

In the architecture of FIG. 2, devices 210 are connected to a new type of edge location at a base station 220B, that implements access capabilities (such as Radio Antenna Network), network functions (e.g., vEPC with CUPS/UPF, etc.), and a first level of edge services (such as a content delivery network (CDN)). Such services conventionally required connectivity to the cloud 240A or the core of the network. Here, in a satellite connectivity setting, such content and compute operations may be coordinated at a base station 220B offering RAN and distributed functions and services. The base station 220B in turn may obtain content or offload processing to a cloud 240B or other service via backhaul connectivity 230B, via satellite communication (for example, in a scenario where a CDN located at the base station 220B needs to obtain uncached content). RAN functions can be split further into wireless and wired processing such as RAN-Distributed Unit (DU) L1/L2 processing and RAN-Centralized Unit (CU) L3 and higher processing.

Figure 3:
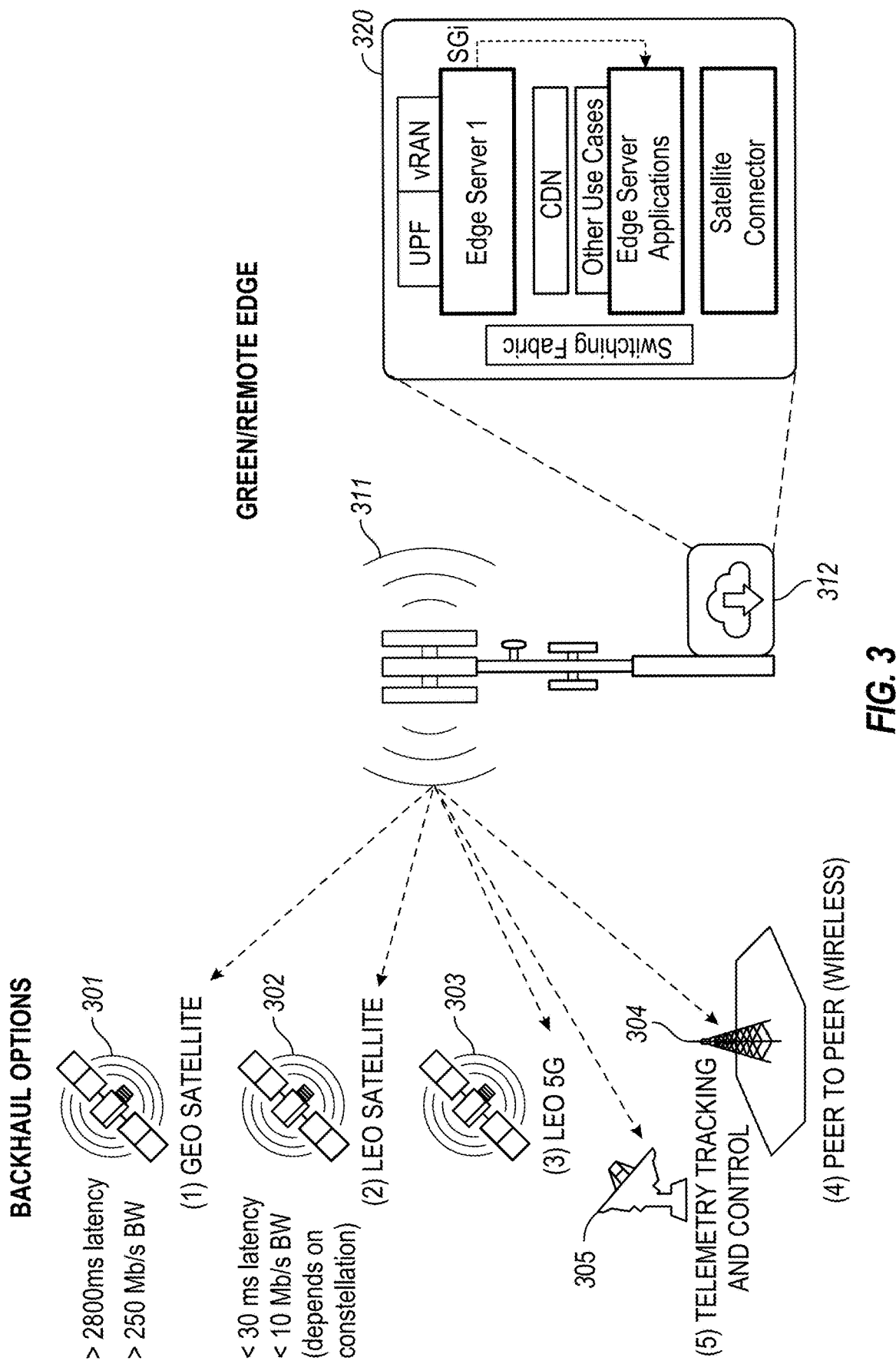
FIG. 3 illustrates multiple types of satellite communication networks, according to an example.

FIG. 3 illustrates multiple types of satellite communication networks. Here, multiple types of backhaul options are illustrated, including a GEO satellite network 301 (discussed below with reference to FIG. 4), a LEO satellite network 302 (discussed below with reference to FIG. 5A), and a LEO 5G satellite network 303 (discussed below with reference to FIG. 5B). In each of these cases, a remote edge RAN access point 311, connected to a 5G core network, uses one or more of the satellite networks 301, 302, 303 to provide backhaul connectivity to a larger communications network (e.g., the Internet). The use of satellite backhaul may be in addition to other types of wired or wireless backhauls, including terrestrial backhaul to other 5G RAN wireless networks (e.g., peer-to-peer to wireless network 304), or control information communicated or obtained via a TTAC network 305. For example, the TTAC network 305 may be used for operation and maintenance traffic, using a separate link for system control backhaul (e.g., on a separate satellite communications band).

At the access point 311, various edge computing services 312 may be provided based on an edge computing architecture 320, such as that included within a server or compute node. This edge computing architecture 320 may include: UPF/vRAN functions; one or more Edge Servers configured to provide CDN, Services, Applications, and other use cases; and a Satellite Connector (hosted in the edge computing architecture 320). This architecture 320 may be connected by a high speed switching fabric.

Figure 4:
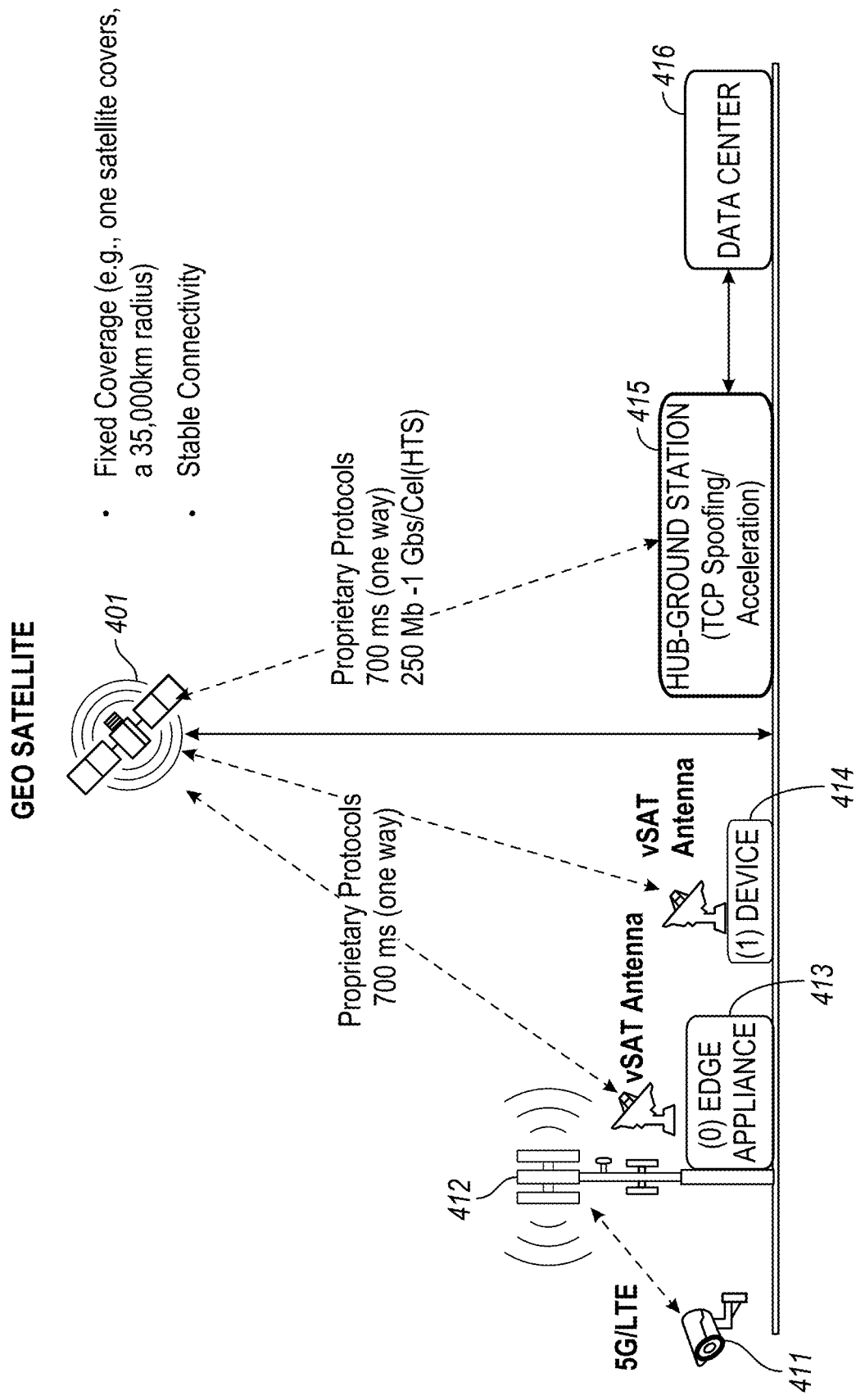
FIG. 4 illustrates terrestrial communication and architecture details in a geosynchronous satellite communication network, according to an example.

FIG. 4 illustrates terrestrial (e.g., anchored, stationed from, or located on-earth) communication and architecture details in a GEO satellite communication network. Here, an example IoT device 411 uses a 5G/LTE connection to a terrestrial RAN 412, which hosts an edge appliance 413 (e.g., for initial edge compute processing). The RAN 412 and edge appliance 413 are connected to a geosynchronous satellite 401, using a satellite link via a very-small-aperture terminal (vSAT) antenna. The geosynchronous satellite 401 may also provide direct connectivity to other satellite connected devices, such as a device 414. The use of 5G and geosynchronous satellite technology makes this solution readily deployable to a variety of locations.

In an example, 5G connectivity is provided in the geosynchronous satellite communication scenario using a distributed UPF (e.g., connected via the satellite) or a stand-alone core (e.g., located at a satellite-connected hub/ground station 415) or directly at the edge appliance 413. Edge compute processing may be performed and distributed among the edge appliance 413, the ground station 415, or a connected data center 416.

Figure 5A:
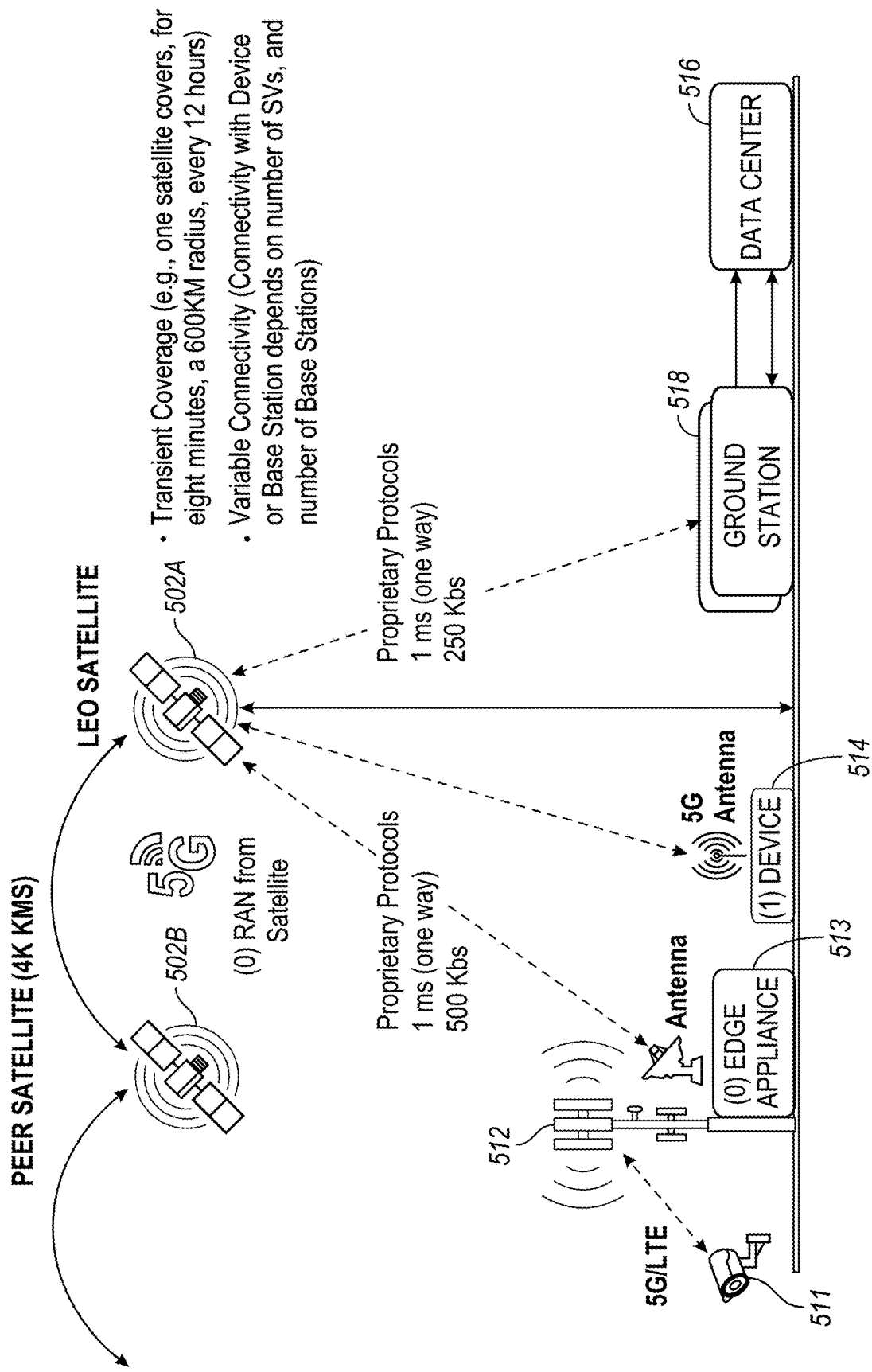
FIGS. 5A and 5B illustrate terrestrial communication and architecture details in a Low Earth Orbit (LEO) satellite communication network, according to an example.
Figure 5B:
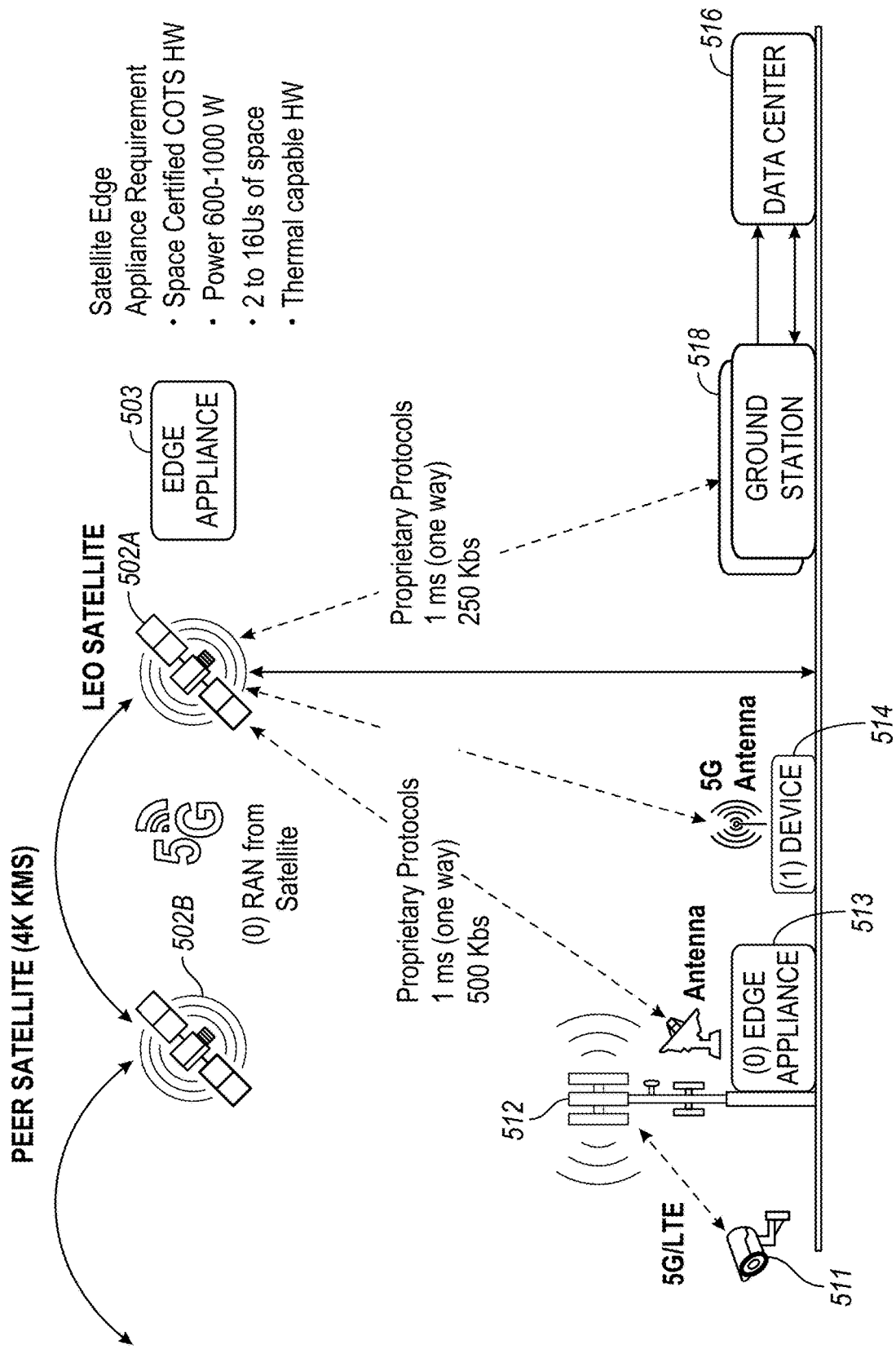

FIGS. 5A and 5B illustrate terrestrial communication and architecture details in a low Earth orbit satellite communication network, provided by SVs 502A, 502B in satellite constellation 502. These drawings depict similar devices and edge systems as FIG. 4, with an IoT device 511, an edge appliance 513, and a device 514. However, the provision of a 5G RAN from SVs 502A, 502B, and the significantly reduced latency from low Earth orbit vehicles, enables much more robust use cases, including the direct connection of devices (device 514) using 5G satellite antennas at the device 514, and communication between the edge appliance 513 and the satellite constellation 502 using proprietary protocols.

As an example, in some LEO settings, one 5G LEO satellite can cover a 500 KM radius for 8 minutes, every 12 hours. Connectivity latency to LEO satellites may be as small as one millisecond. Further, connectivity between the satellite constellation and the device 514 or the base station 512 depends on the number and capability of satellite ground stations. In this example, the satellite 501 communicates with a ground station 518 which may host edge computing processing capabilities. The ground station 518 in turn may be connected to a data center 516 for additional processing. With the low latency offered by 5G communications, data processing, compute, and storage may be located at any number of locations (at edge, in satellite, on ground, at core network, at low-latency data center).

FIG. 5B includes the addition of an edge appliance 503 located at the SV 502A. Here, some of the edge compute operations may be directly performed using hardware located at the SV 502A, reducing the latency and transmission time that may have been otherwise needed to communicate with the ground station 518 or data center 516. Likewise, in these scenarios, edge compute may be implemented or coordinated among specialized processing circuitry (e.g., FPGAs) or general purpose processing circuitry (e.g., x86 CPUs) located at the satellite 501, the ground station 518, the devices 514 connected to the edge appliance 513, the edge appliance 513 itself, and combinations thereof.

Although not shown in FIGS. 5A to 5B, other types of orbit-based connectivity and edge computing may be involved with these architectures. These include connectivity and compute provided via balloons, drones, dirigibles, and similar types of non-terrestrial elements. Such systems encounter similar temporal limitations and connectivity challenges (like those encountered in a satellite orbit).

Figure 6:
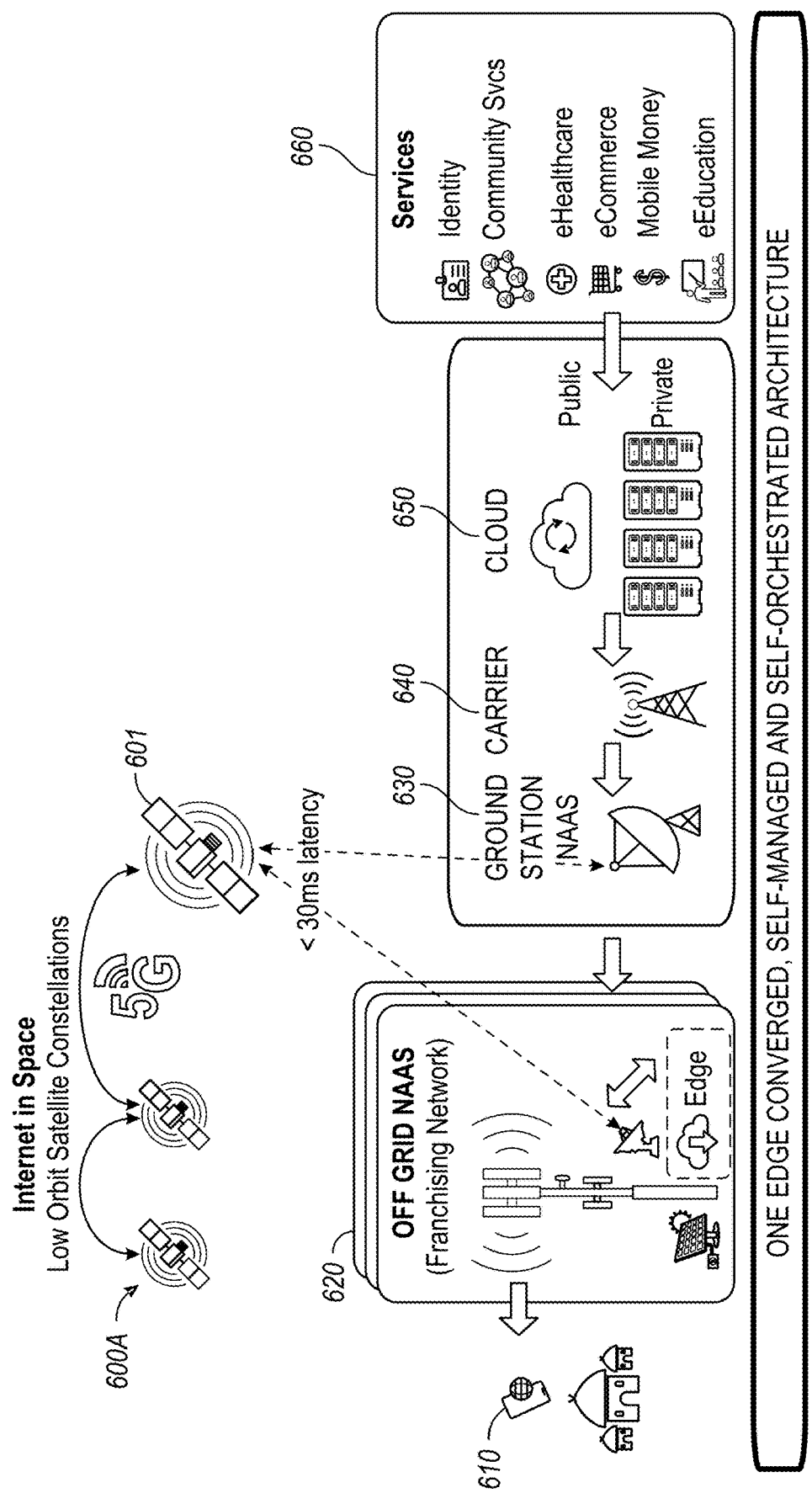
FIG. 6 illustrates a network connectivity ecosystem implementing a LEO satellite communication network, according to an example.

FIG. 6 illustrates a network connectivity ecosystem implementing a satellite communication network. Here, a satellite 601, part of satellite constellation 600A, provides coverage to an "off-grid" wireless network 620 (such as a geographically isolated network without wired backhaul). This wireless network 620 in turn provides coverage to individual user equipment 610. Via the satellite connection, a variety of other connections can be made to broader networks and services. These connections include connection to a carrier 640 or to a cloud service 650 via a satellite ground station 630. At the cloud service 650, a variety of public or private services 660 may be hosted. Additionally, with the deployment of edge computing architectures, these services can be moved much closer to the user equipment 610, based on coordination of operations at the wireless network 620, the satellite constellation 600, the ground station 630, or the carrier 640. Such configurations are particularly useful for the connection of industry IoT devices, mobility devices (such as robotaxis, autonomous vehicles), and the overall concept of offering connectivity for "anyone" and "anything".

Figure 7:
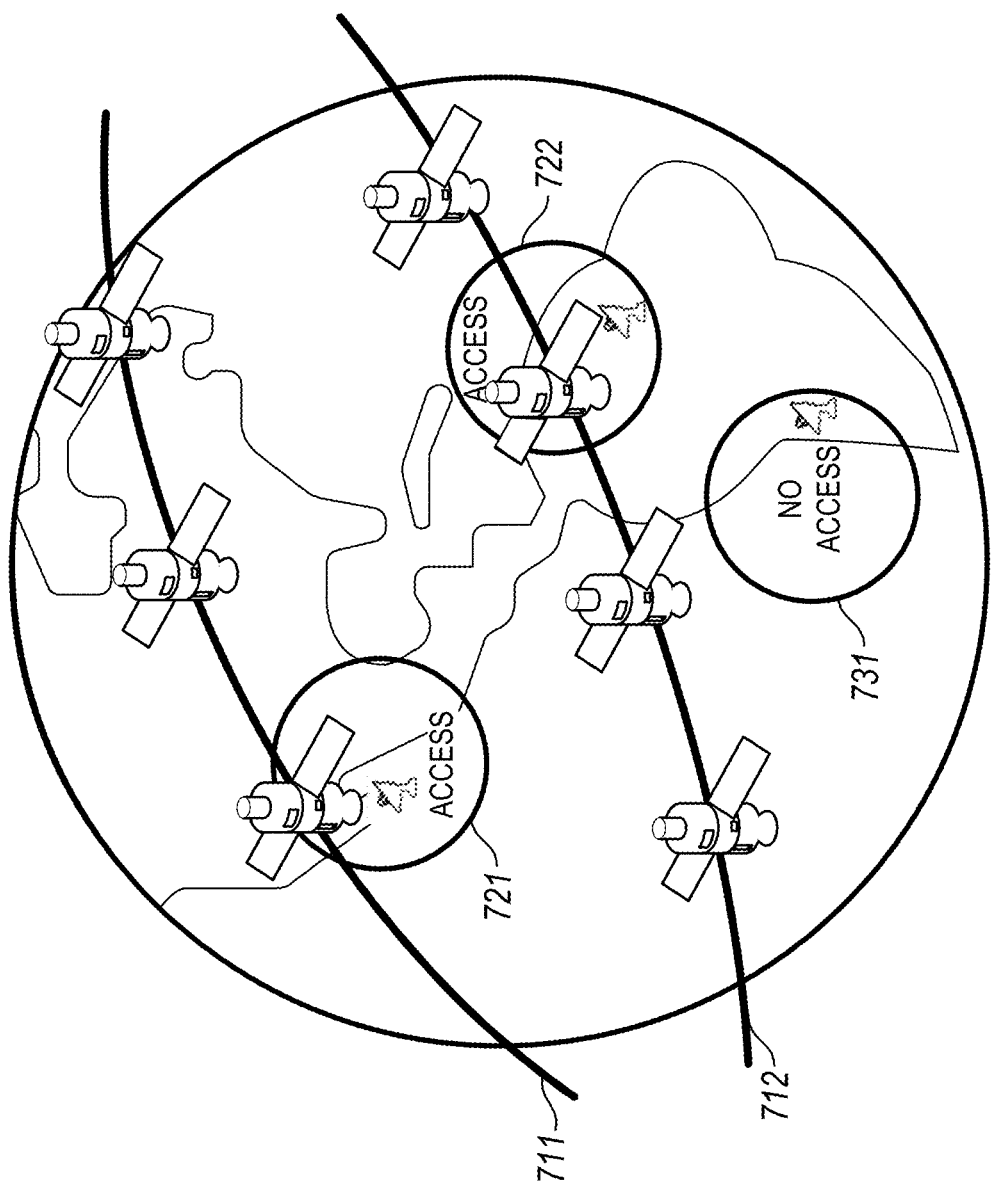
FIG. 7 illustrates an overview of terrestrial-based, LEO satellite-enabled edge processing, according to an example.

FIG. 7 illustrates an example, simplified scenario of geographic satellite connectivity from multiple LEO satellite communication networks, which depicts the movement of the relevant LEO SVs relative to geographic areas. Here, the orbits 711 and 712 of respective satellite constellations operate to provide network coverage in limited geographic areas 721 and 722, respectively. In contrast, there is no access provided in area 731. It will be understood that the geographic positions of relevant satellite coverage areas may play an important part in determining service characteristics, exclusion or inclusion zones, and coordination of satellite-ground processing.

Figure 8:
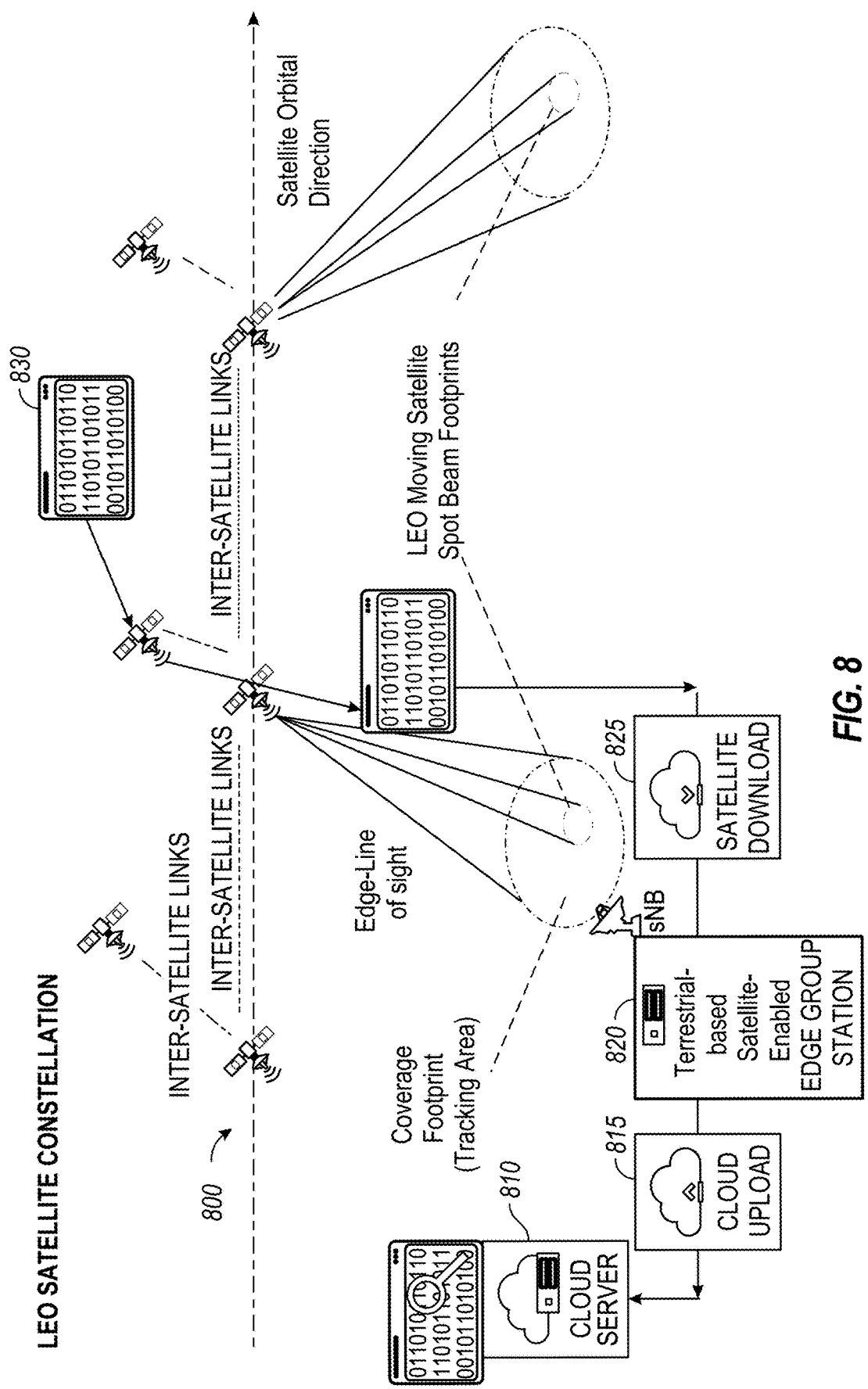
FIG. 8 illustrates a scenario of geographic satellite connectivity from LEO satellite communication networks, according to an example.

FIG. 8 illustrates an overview of terrestrial-based, satellite-enabled edge processing. As shown, a terrestrial-based, satellite enabled EDGE ground station (satellite nodeB, sNB) 820 obtains coverage from a satellite constellation 800, and downloads a data set 830. The constellation 800 may coordinate operations to handoff the download using inter-satellite links (such as in a scenario where the data set 830 is streamed, or cannot be fully downloaded before the satellite footprint moves).

The satellite download 825 is provided to the sNB 820 for processing, such as with a cloud upload 815 to a server 810 (e.g., a CDN located at or near the sNB 820). Accordingly, once downloaded to the sNB 820 (and uploaded to the server 810), the user devices located within the terrestrial coverage area (e.g., 5G coverage area) of the sNB 820 now may access the data from the server 810.

Figure 9A:
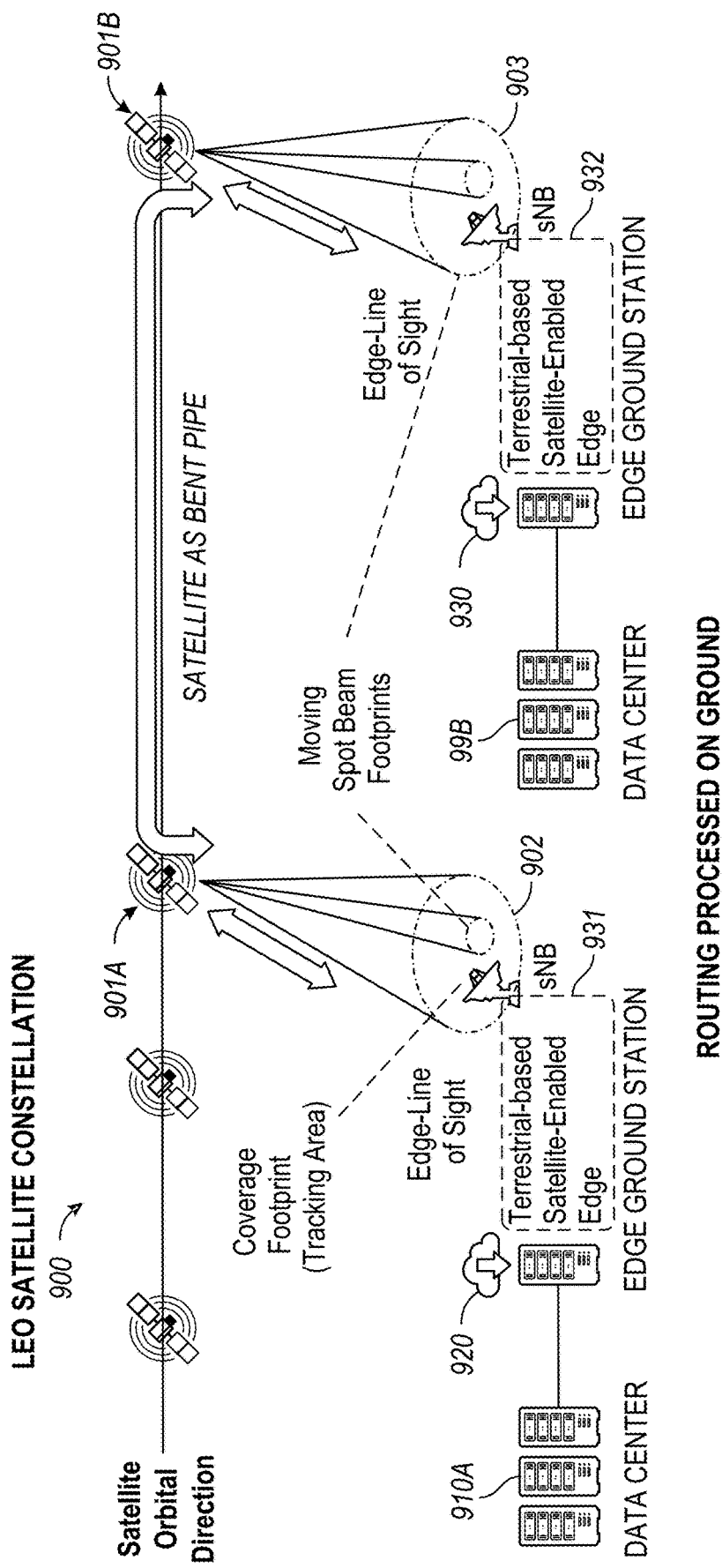
FIGS. 9A and 9B illustrate terrestrial-based, LEO satellite-enabled edge processing arrangements, according to an example.

FIG. 9A illustrates a terrestrial-based, satellite-enabled edge processing arrangement, where routing is performed "on-ground" and the satellite is used as a "bent pipe" between edge processing locations. Here, the term "bent pipe" refers to the use of a satellite or satellite constellation as a connection relay, to simply communicate data from one terrestrial location to another terrestrial location. As shown in this figure, a satellite 900 in a constellation has an orbital path, moving from position 901A to 901B, providing separate coverage areas 902 and 903 for connectivity at respective times.

Here, when a satellite-enabled edge computing node sNB 931 is in the coverage area 902, it obtains connectivity via the satellite 900 (at position 901A), to communicate with a wider area network. Additionally, this edge computing node sNB 931 may be located at an edge ground station 920 which is also in further communication with a data center 910A, for performing computing operations at a terrestrial location.

Likewise, when a satellite-enabled edge computing node (sNB) 932 is in the coverage area 903, it obtains connectivity via the satellite 900 (at position 901B), to communicate with a wider area network. Again, computing operations (e.g., services, applications, etc.) are processed at a terrestrial location such as edge ground station 930 and data center 910B.

Figure 9B:
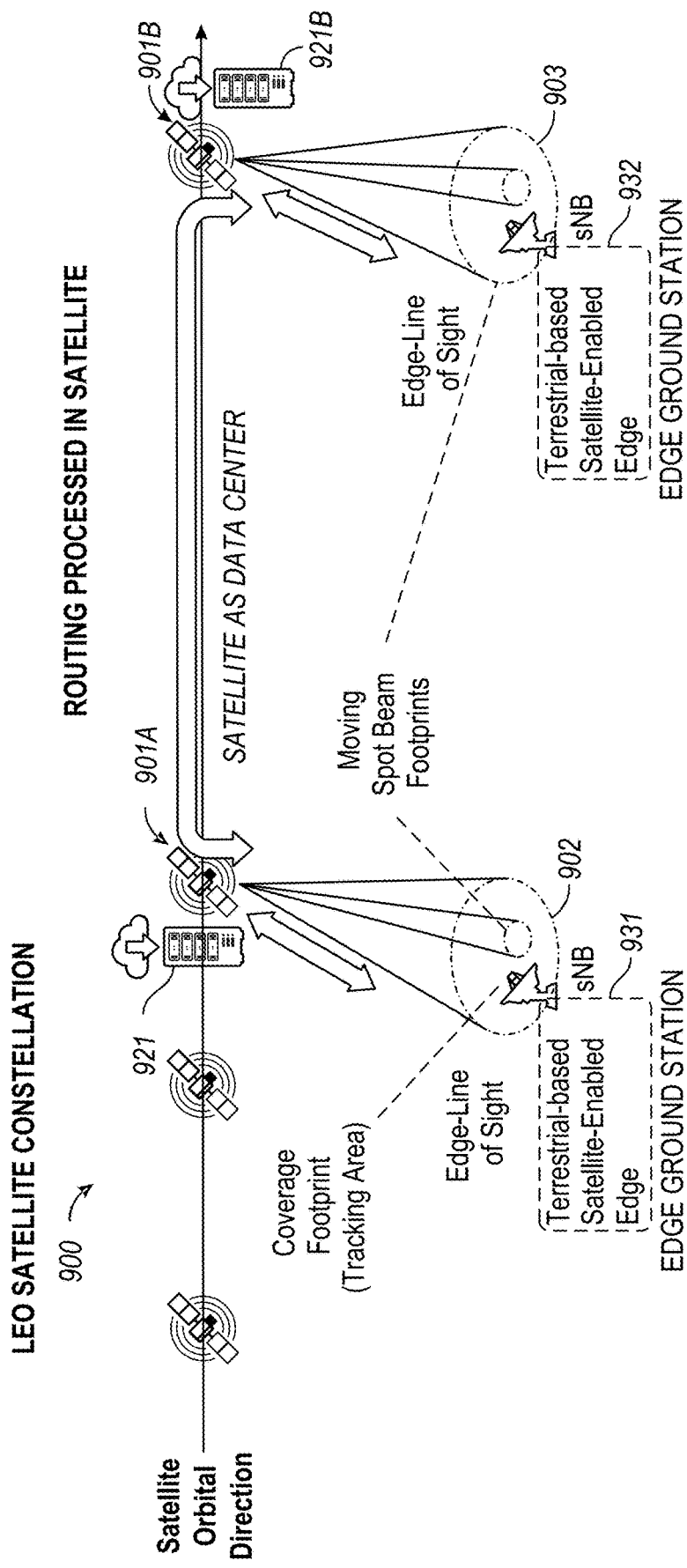

FIG. 9B illustrates another terrestrial-based, satellite-enabled edge processing arrangement. Similar to the arrangement depicted in FIG. 9A, this shows the satellite 900 in a constellation along an orbital path, moving from position 901A to 901B, providing separate coverage areas 902 and 903 at respective times. However, in this example, the satellite is used as a data center, to perform edge computing operations (e.g., serve data, compute data, relay data, etc.).

Specifically, at the satellite vehicle, edge computing hardware 921 is located to process computing or data requests received from the ground station sNBs 931 and 932 in the coverage areas 902 and 903. This may have the benefit of removing the communication latency involved with another location at the wide area network. However, due to processing and storage constraints, the amount of computation power may be limited at the satellite 900 and thus some requests or operations may be moved to the ground station sNBs 931 and 932.

As will be understood, edge computing and edge network connectivity may include various aspects of RAN and software defined networking processing. Specifically, in many of these scenarios, wireless termination may be moved between ground and satellite, depending on available processing resources. Further, in these scenarios, URLCC (ultra-reliable low latency connections) processing may be enabled, based on the configuration of inter-satellite communication links. The configuration and management of connectivity, URLCC, and other communication features may be provided using the following multi-orbit communication examples.

Types and Scenarios for Multi-Orbit Processing and Communications

The following examples describe the configuration of a "data center" that implements an "network operation center" (NOC) in orbit, and which coordinates compute and/or networking among one or multiple satellites located in multiple orbits. As will be understood, the use of a multi-orbit approach is more practical than having a NOC and data center located only at LEO devices. Among other reasons, this is because many LEOs are needed to supply low latency to user terminals, and LEOs with orbital adjustments are disposable after a few years of wear and tear. Higher orbit satellites can be fewer and last longer, and can coordinate such network and data processing operations to multiple LEOs located at a lower orbital plane.

Figure 10A:
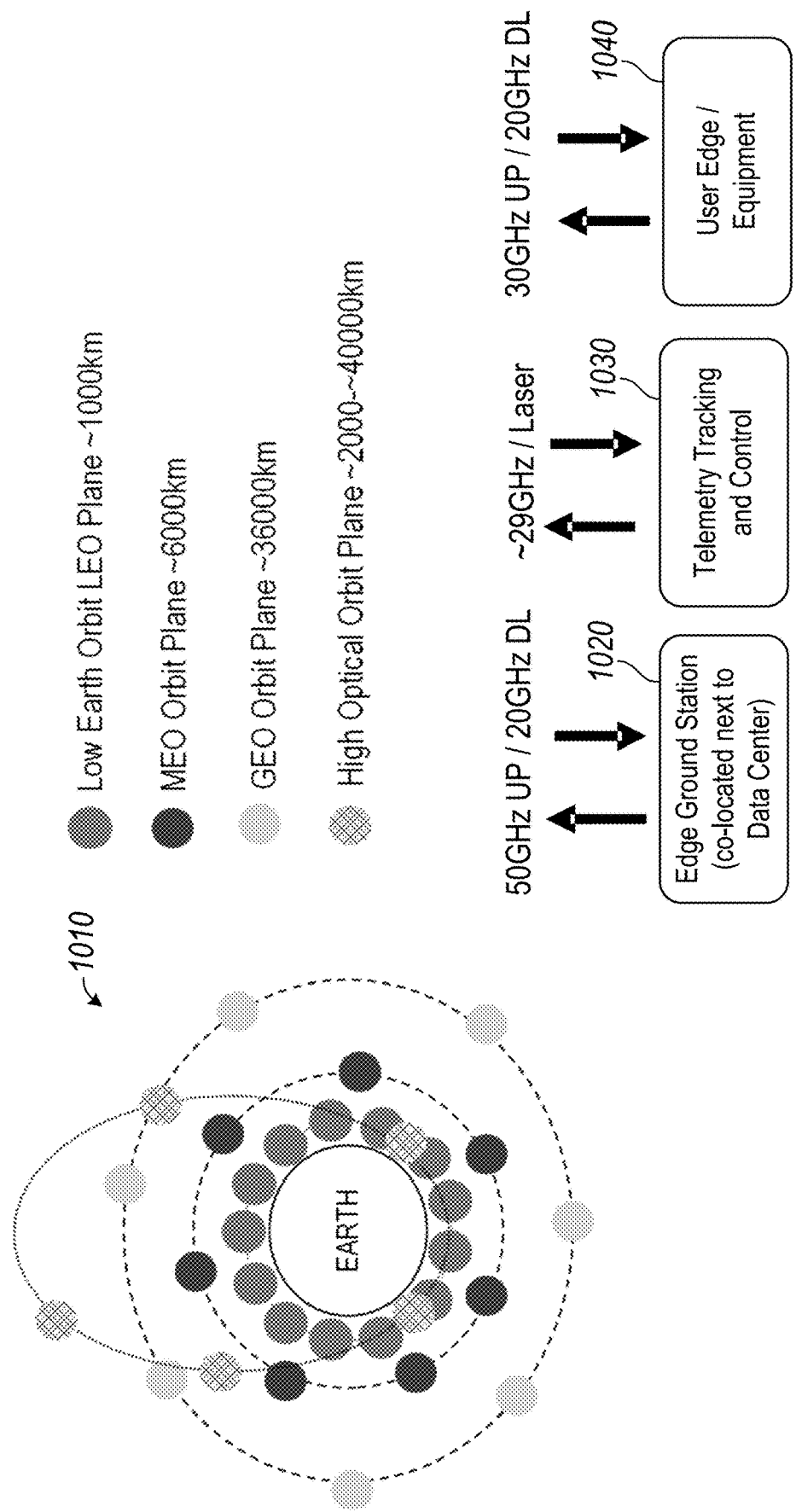
FIGS. 10A and 10B illustrate non-terrestrial environments for use and control of satellites in multiple types of satellite orbits, according to an example.

FIG. 10A illustrates an example non-terrestrial environment, showing orbital planes for multiple types of satellite orbits. Specifically, within the environment 1010, orbital planes around Earth include: a low Earth orbit (LEO) plane (e.g., operating at an altitude of about 1000 km); a middle Earth orbit (MEO) plane (e.g., operating at an altitude of about 6000 km); a geosynchronous orbit plane (e.g., operating at an altitude of about 36000 km); and a high-Earth elliptical orbit (HEO) plane, providing satellites with optical communications to communicate with other devices (e.g., operating among altitudes between 2000-40000 km, typically higher than that of a geosynchronous orbit). High elliptical orbit satellites (HEO) can be positioned so the ends of the elliptical orbit are next to high population areas such as North America.

In the environment 1010, communications between the various satellites and Earth may include: communications with an edge ground stations 1020 (e.g., communication ground stations co-located with a data center); communications with a telemetry tracking and control system 1030; and communications with user edge devices or equipment 1040. It will be understood that different types of frequency bands and bandwidth may be used for each of these types of uplink- and downlink-communications.

In the environment 1010, the HEO orbital plane is used to operate one or more HEO satellites that perform the data center/network operation processing, and these HEO satellites then conduct inter-satellite communications to communicate the results of such processing to controlled SVs and constellations in other orbital planes. Further, the high-Earth orbit plane may operate the one or more HEO satellites to communicate with on-earth equipment. The control and coordination of compute at the HEO (and among the MEO satellites) may enable continuity of coverage, failover or automatic maintenance operations using MEO/HEO, and payload routing control via the MEO/HEO, among other examples.

Figure 10B:
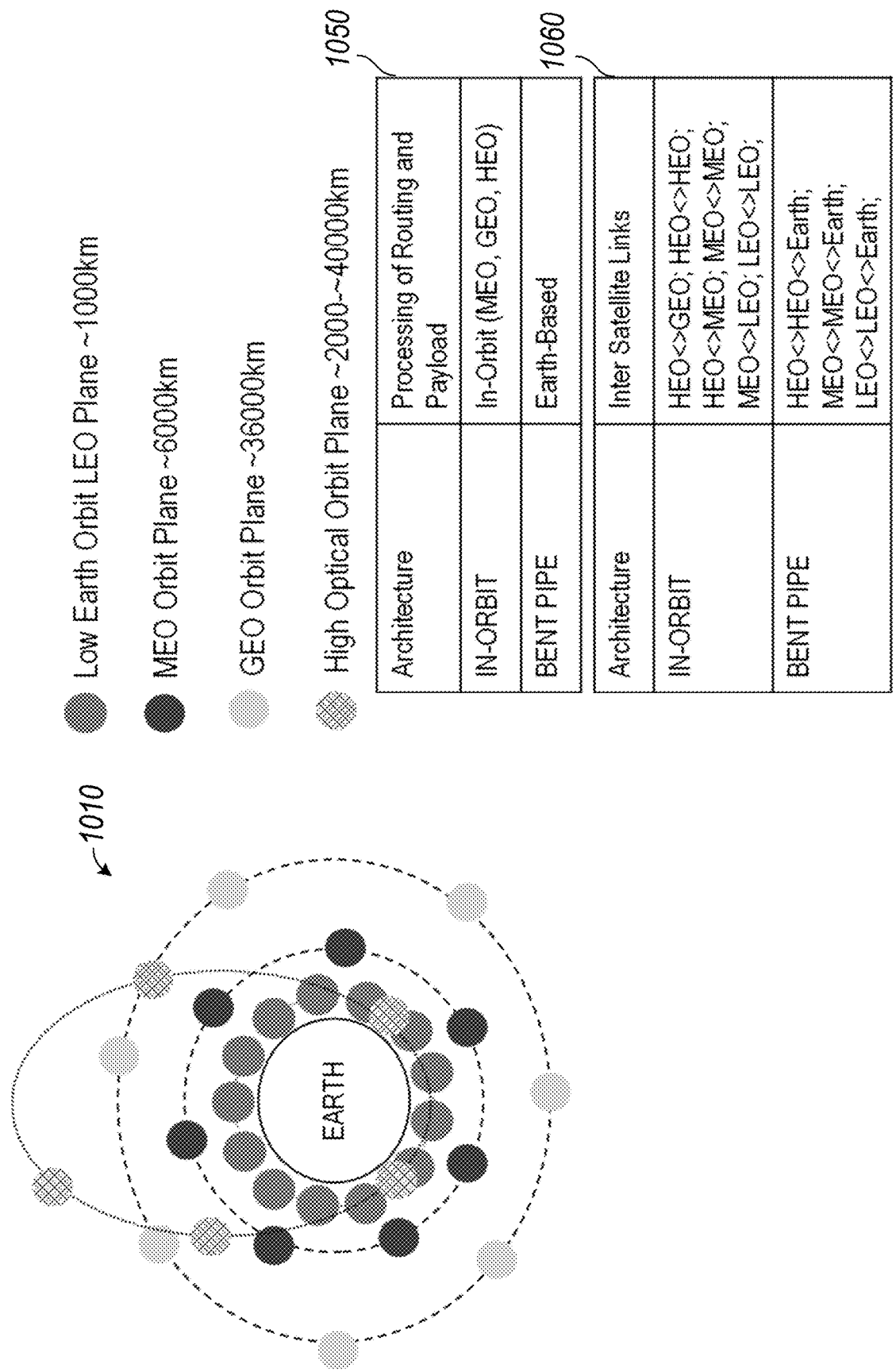

FIG. 10B illustrates a further listing of communication architectures and communication links available within the environment 1010. For instance, with use of an in-orbit processing architecture, routing and payload processing for LEO satellites 1050 can occur in-orbit at one or more of the MEO, GEO, or HEO planes; with use of a bent-pipe processing architecture, routing and data payload processing for LEO satellites 1050 can occur on the ground (on-earth). With use of an in-orbit processing architecture, available inter-satellite links 1060 may include links between: HEO and GEO satellites; HEO and HEO satellites; HEO and MEO satellites; MEO and MEO satellites; MEO and LEO satellites; and LEO and LEO satellites. With use of a bent-pipe processing architecture, inter-satellite links 1060 and communications can occur between HEO satellites to Earth; between MEO satellites to Earth; and between LEO satellites to Earth.

Figure 11:
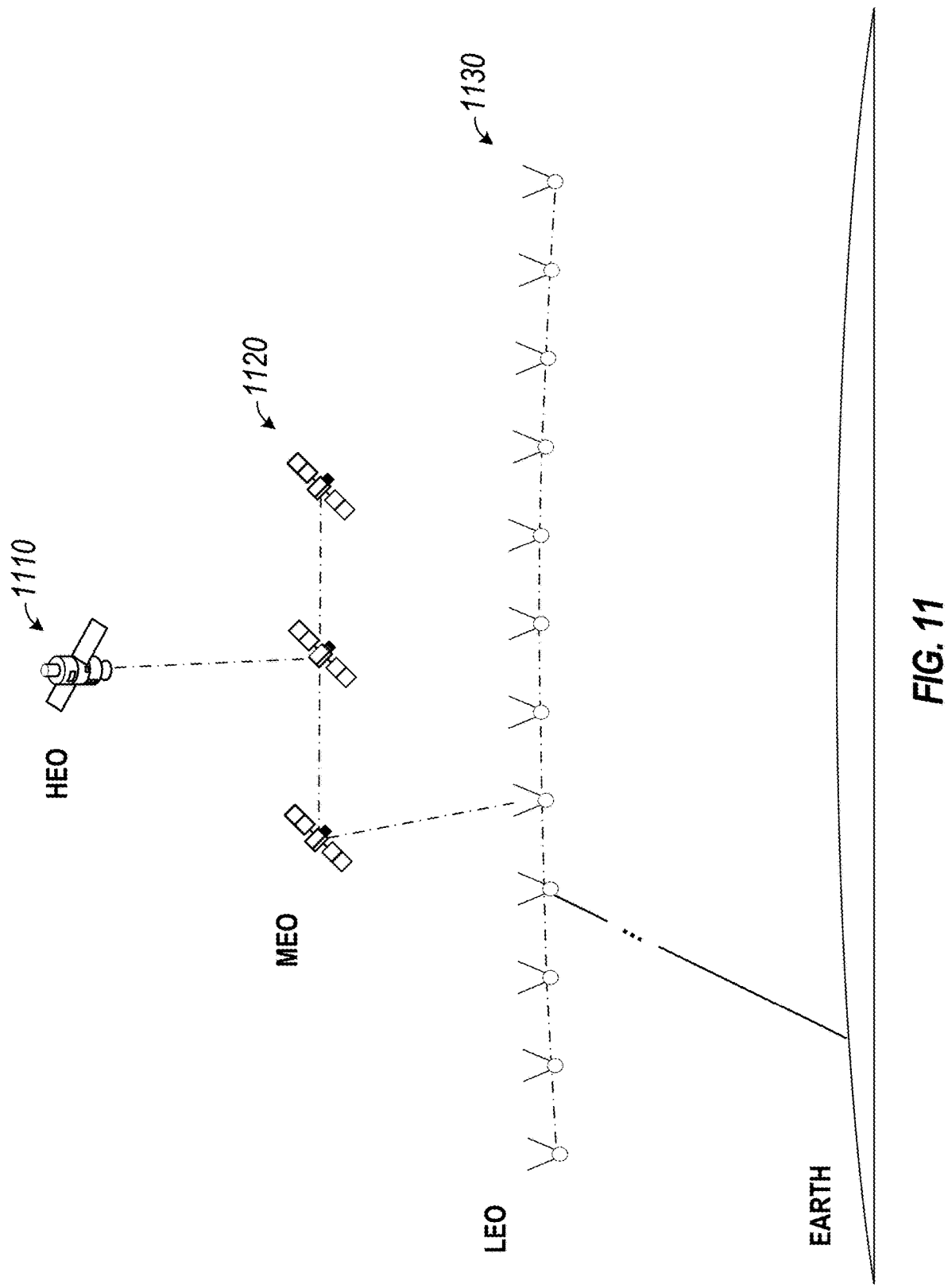
FIG. 11 illustrates a simplified example of communications among satellites in multiple orbits, according to an example.

FIG. 11 depicts a simplified implementation of a HEO satellite 1110 operating in an HEO orbital plane, used to establish links within multi-orbit planes. As shown the HEO satellite 1110 communicates with MEO satellites 1120 operating in a MEO orbital plane, and the MEO satellites 1120 include inter-satellite links among themselves; the MEO satellites 1120 then can communicate with LEO satellites 1130 located in an LEO orbital plane, and the LEO 1130 satellites include inter-satellite links among themselves. A communication pathway then can be provided to Earth.

It will be understood that a variety of communication technologies, not directly depicted in FIGS. 10A, 10B, and 11, may be used among the HEO, MEO, and LEO satellite networks operating in the same or different orbital paths. This may include v-band communications or optical links between satellites, beamforming to satellites at or among an orbital plane, and the like.

In an example, the HEO includes a data center and NOC to coordinate as the "brain" in the sky, serving as a director or orchestrator of communication paths. This may include the control of a variety of inter-satellite links—including ultra-low latency data paths established among such inter-satellite links—among the LEO, MEO, and other orbital planes. As a result, the HEO provides the equivalent of an edge computing server in space, and may process or coordinate a variety of space-originated or space-centric data and data operations.

Figure 12A:
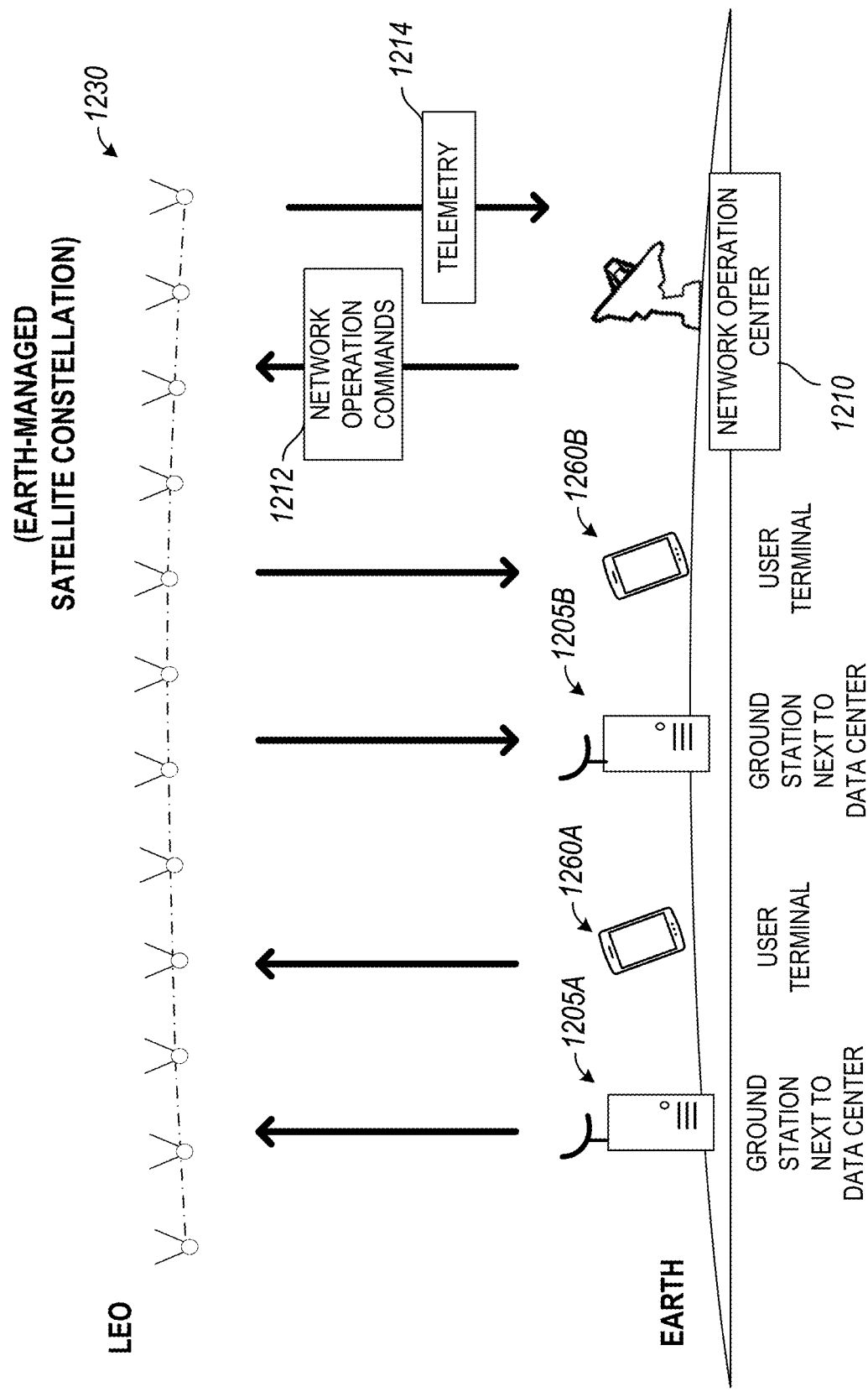
FIGS. 12A to 12C illustrate further scenarios of network connectivity and data center management among satellites in multiple orbits, according to an example.
Figure 12B:
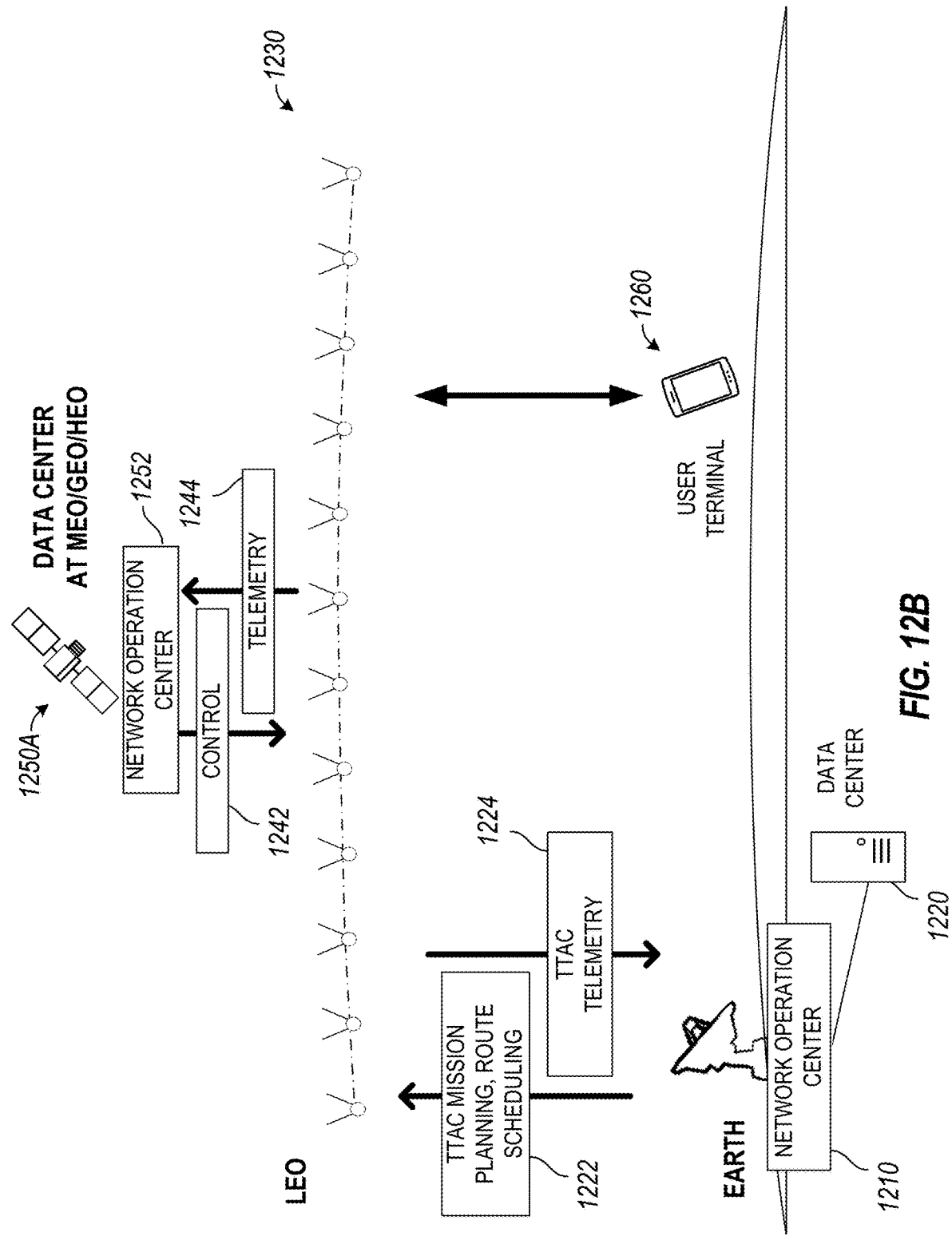
Figure 12C:
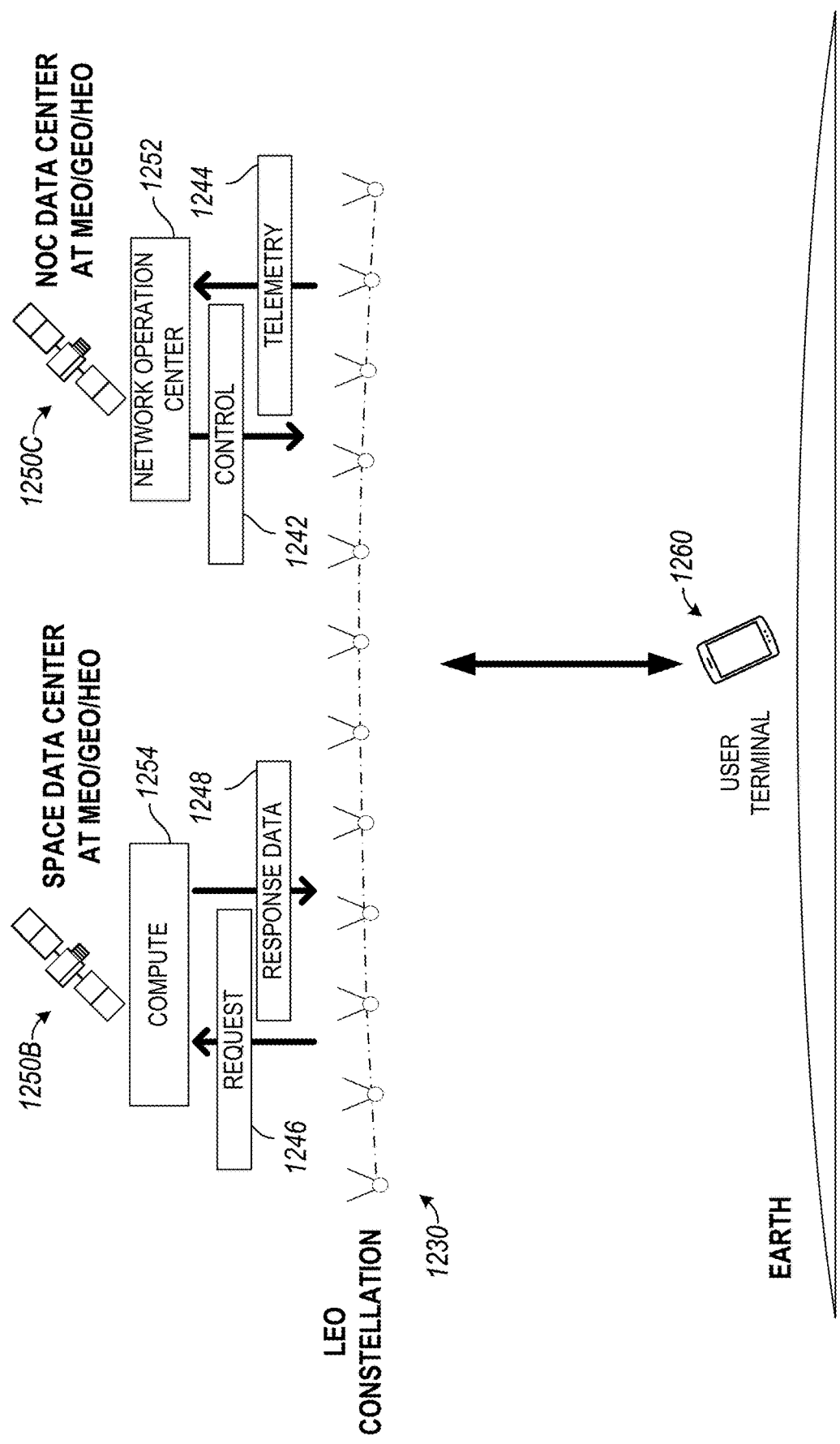

FIG. 12A-12C illustrates further scenarios of network connectivity including how the role of a network operation center (NOC) may be transferred from an Earth-based configuration to a space-based configuration, or vice versa.

FIG. 12A depicts a scenario where a LEO constellation 1230 provides network connectivity to user terminals 1260A and 1260B, and coordinates ground data processing with a ground station 1205A and 1205B. The network operation center NOC 1210 controls the LEO constellation 1230 using various network operation commands 1212, and receives telemetry 1214 to identify the status of the constellation 1230 and network operations within the constellation 1230. As discussed herein, a LEO constellation 1230 may operate in multiple LEO orbital planes. Thus, a LEO constellation may consist of thousands of space vehicles (SVs); and each LEO constellation SV may have limited compute capable of a few control commands A LEO SV typically has batteries, orbital thrusters, solar panel, UL/DL antenna, and inter-satellite link (ISL) antennas, and may require control of one or more of these systems to maintain proper operation. Accordingly, the network operation commands 1212 and telemetry 1214 may relate to any of these aspects, including telemetry that directly or indirectly indicates the condition or states of network paths, services, or operations within a satellite constellation. In some examples, the telemetry 1214 may also relate to position or propulsion characteristics, or operational conditions or states of equipment used in the satellite constellation (e.g., hardware or software states, signal strength, power or battery states, antenna configurations, component health, switching configurations, propulsion or thermal system data, and the like).

In various examples, the functions of the NOC may be offloaded to non-terrestrial locations. For instance, to control a LEO constellation, the NOC may operate at a higher orbit than the LEO constellation with capable MEO/HEO/GEO satellites to handle mission planning and scheduling (e.g., using input data from telemetry, and output data as routing tables), while user terminals may be on the Earth or may be in space (even extending to space stations on the moon or other locations). "LEO" satellites are generally less capable than MEO/HEO/GEO satellites to perform such compute operations, but as a tradeoff there are many more LEO satellites than MEO/HEO/GEO satellites (which keeps costs low). Accordingly, all of the operations performed on Earth to maintain a constellation may move into space including network operations, data storage, and compute. A space-based data center may be fully autonomous and not need any ground-based control.

FIG. 12B depicts a scenario for enabling network controls from an autonomous, redundant, multi-orbital satellite data center. In an example, a NOC 1210 or 1252 is established as an authority for control of a satellite constellation, the network communication paths occurring within this constellation, and associated data processing occurring at a data center. The NOC 1210 or 1252 can be located at terrestrial or non-terrestrial locations (e.g., at Earth, operated as terrestrial NOC 1210 at a terrestrial data center 1220; or in Space, operated as non-terrestrial NOC 1252 at a data center 1250A). Each NOC 1210 or 1252 utilizes network function and software defined networks, and each NOC 1210 or 1252 is connected to a Data Center (e.g., data center 1220, 1250A) including storage and specialized compute resources that is capable of performing all Mission Planning and Scheduling (MPS) constellation operations.

For instance, in the setting of FIG. 12B, the Earth NOC 1210 MPS may schedule activity/routing (on/off and frequency) for each UL/DL and fore/aft/right/left satellite antenna within a LEO constellation. The Earth NOC TTAC UL (data 1222) sends MPS routing control commands to individual LEO constellation SVs (e.g., using the frequencies discussed above). The Earth NOC TTAC DL (data 1224) receives telemetry about individual LEO constellation SVs including orbital data to determine MPS activities (routing) based on battery power levels, antenna health, time synchronization, etc. Likewise, the Earth NOC TTAC UL (data 1222) may send an entire MPS routing database for all SVs to the Space NOC 1252 MPS at the higher-than-LEO constellation orbit.

In this setting, the Earth NOC 1210 has pre-determined trigger rules that, when satisfied, changes control from the Earth NOC 1210 to the Space NOC 1252. The Space NOC 1252 MPS then reverses all Earth NOC TTAC UL/DL Operations to be performed on the Space NOC in the higher-than-LEO constellation orbit.

When enabled, the Space NOC TTAC downlink (represented by control data 1242) sends MPS routing control commands to individual LEO constellation SVs (e.g., using the frequencies discussed above). The Space NOC TTAC UL (data 1244) receives telemetry about individual LEO constellation SVs including orbital data to determine MPS activities (routing) based on battery power levels, antenna health, time synchronization. The space NOC TTAC downlink may send an entire MPS routing database for all SVs to Earth NOC if online. When configured, the Space NOC 1252 utilizes inter satellite links to use inter-connect compute, storage, and network resources in space just as an Earth based NOC.

The Space NOC 1252 may also have pre-determined Trigger Rules, which when satisfied, changes from Space NOC to Earth NOC control. Trigger rules for switching control may be based on frequency, failure conditions, or other features. For instance, trigger rules may be automatically activated based on space weather conditions (e.g., based on an electromagnetic storm), disaster or interruption events on-ground or in-space, maintenance calculations, or other relevant management conditions.

FIG. 12C depicts a similar scenario as provided in FIG. 12B, but extending the use of a space data center 1250B used for performing compute operations. Here, the LEO constellation 1230 may provide a request 1246 to utilize compute at the space data center 1250B, and receive a response data 1248 with the result of the compute. In the setting of FIG. 12C, all NOC and data compute operations are thus coordinated at the MEO/GEO/HEO data centers 1250B, 1260C.

Figure 13:
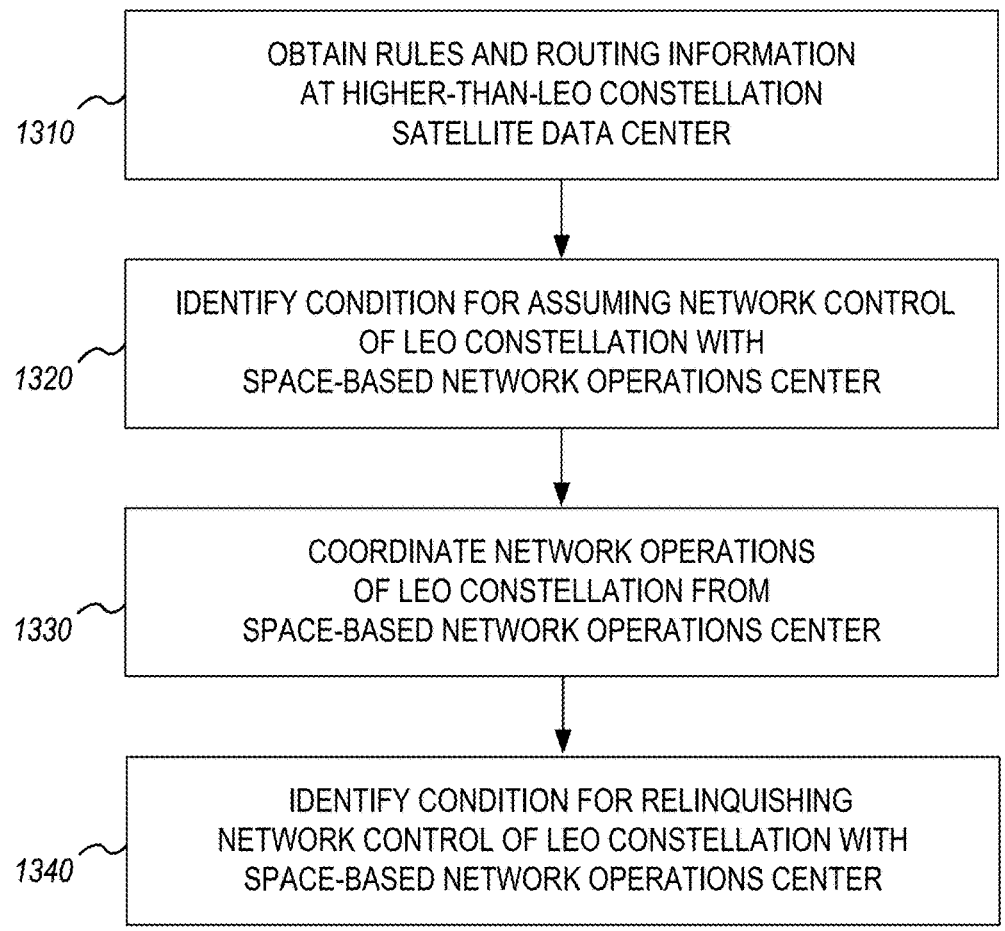
FIG. 13 illustrates a flowchart of a method of implementing network connectivity and data center management among satellites in multiple orbits, according to an example.

FIG. 13 illustrates a flowchart 1300 of an example method of implementing network connectivity and data center management among satellites in multiple orbits.

The method begins, at operation 1310, to obtain rules and routing information at the higher-than-LEO constellation satellite data center (e.g., as discussed above with reference to FIGS. 12A and 12B)).

The method continues, at operation 1320, to identify a condition (e.g., a trigger) for assuming network control of a LEO constellation, with a space-based network operations center at the higher-than-LEO constellation satellite data center. Such a condition may cause a switch of network control from use of a terrestrial NOC to a non-terrestrial NOC, while keeping the underlying LEO constellation in place.

The method continues, at operation 1330, to coordinate network operations (and data processing operations, as applicable) for the LEO constellation, at the higher-than-LEO constellation satellite data center.

The method completes, at operation 1340, to identify a condition for relinquishing network control of the LEO constellation, at the higher-orbit-than-LEO constellation satellite data center.

Figure 14:
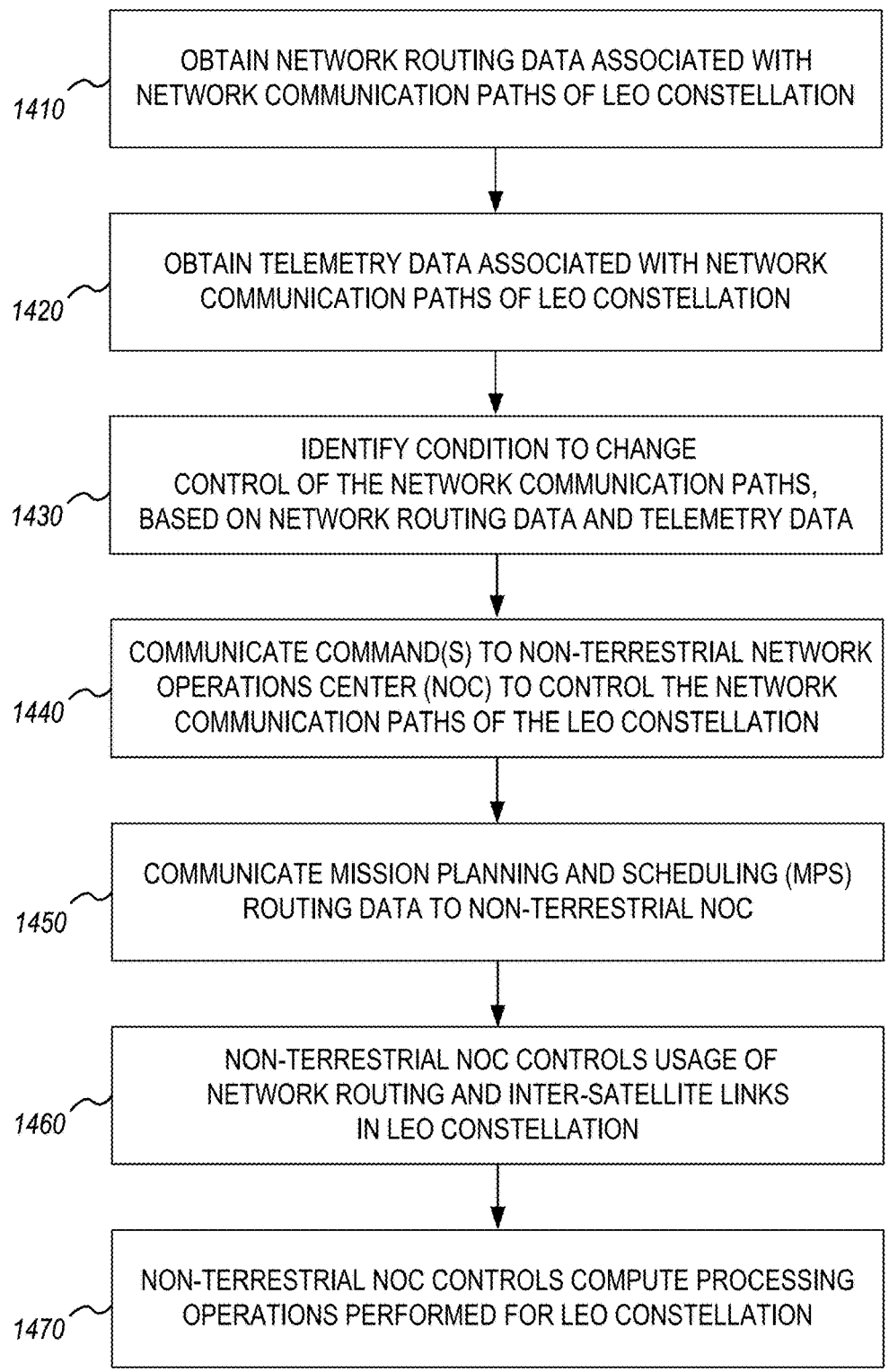
FIG. 14 illustrates a flowchart of a method of operations for coordinating network operations for use of a non-terrestrial network operations center, according to an example.

FIG. 14 illustrates a flowchart 1400 of an example method of implementing network connectivity and data center management among satellites in multiple orbits. In an example, the method of flowchart 1400 is performed by a terrestrial NOC located at a terrestrial (on-earth) data center. However, the method may also be performed in part or in whole by non-terrestrial data processing locations, including at a non-terrestrial NOC to transition control from a first NOC to a second NOC.

At 1410, operations are performed to obtain network routing data, and at 1420 operations are performed to obtain telemetry data. This network routing data and telemetry data is associated with network communication paths used in and by a low-Earth orbit (LEO) satellite constellation of a first satellite group or network. For instance, the network communication paths may include a plurality of inter-satellite links in the first satellite network, and various downlink/uplink connections as described above.

At 1430, operations are performed to identify a condition to change control of the network communication paths of the LEO satellite constellation. This condition may be identified based on the network routing data and the telemetry data. For instance, at least one characteristic indicated in the telemetry data relating to battery power levels, antenna health, or synchronization state, may indicate or trigger the condition. In a further example, the condition may be identified based on at least one rule for operation of the network communication paths, in light of rule(s) defined for communication frequency, failure conditions, weather conditions, maintenance calculations, or identified events, as suggested above.

At 1440, operations are performed to communicate at least one command to a non-terrestrial NOC, such as a non-terrestrial NOC located in a second satellite group or network (or, a single satellite) that operates independently from the LEO satellite constellation. This command may cause the non-terrestrial NOC to take over control of the network communication paths of the LEO satellite constellation from the terrestrial NOC. This command may be successfully performed, for example, in scenarios where the non-terrestrial NOC (by itself, or with other entities in the second satellite network) is capable to perform operations (e.g., network control and compute operations) with the non-terrestrial NOC that were previously performed by the terrestrial NOC. This second satellite group or network (or, single satellite) may operate in a second orbital plane that differs from a first orbital plane used by the LEO satellite constellation, such as in a scenario where the second orbital plane operates in a medium Earth orbital plane, geosynchronous orbital plane, or high Earth orbital plane, consistent with the examples above.

In an example, the result of the at least one command is to cause the non-terrestrial NOC to take over control of MPS operations of the LEO satellite constellation. The MPS operations may be facilitated at 1450 with the communication of MPS routing data (e.g., a routing table or other routing data format) to the non-terrestrial NOC.

At 1460, in a further example, operations are performed to control the usage of network routing and inter-satellite links in the LEO satellite constellation, in response to the command(s) with use of the non-terrestrial NOC. For instance, such control may include control of the network communication paths that involve: uplink routing, downlink routing, uplink frequencies, downlink frequencies, or use of fore, aft, right, or left satellite antennas of respective satellite vehicles.

At 1470, in a further example, operations are performed to control and coordinate compute processing operations associated with the LEO satellite constellation, in response to the command(s) with use of the non-terrestrial NOC. For instance, such compute processing operations may be coordinated with a terrestrial data center or a non-terrestrial data center in the second satellite network (e.g., associated with the non-terrestrial NOC).

Implementation in Edge Computing Scenarios

It will be understood that the present satellite communication and networking arrangements may be integrated with many aspects of edge computing strategies and deployments. Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

In the context of satellite communication networks, edge computing operations may occur, as discussed above, by: moving workloads onto compute equipment at satellite vehicles; using satellite connections to offer backup or (redundant) links and connections to lower-latency services; coordinating workload processing operations at terrestrial access points or base stations; providing data and content via satellite networks; and the like. Thus, many of the same edge computing scenarios that are described below for mobile networks and mobile client devices are equally applicable when using a non-terrestrial network.

Figure 15:
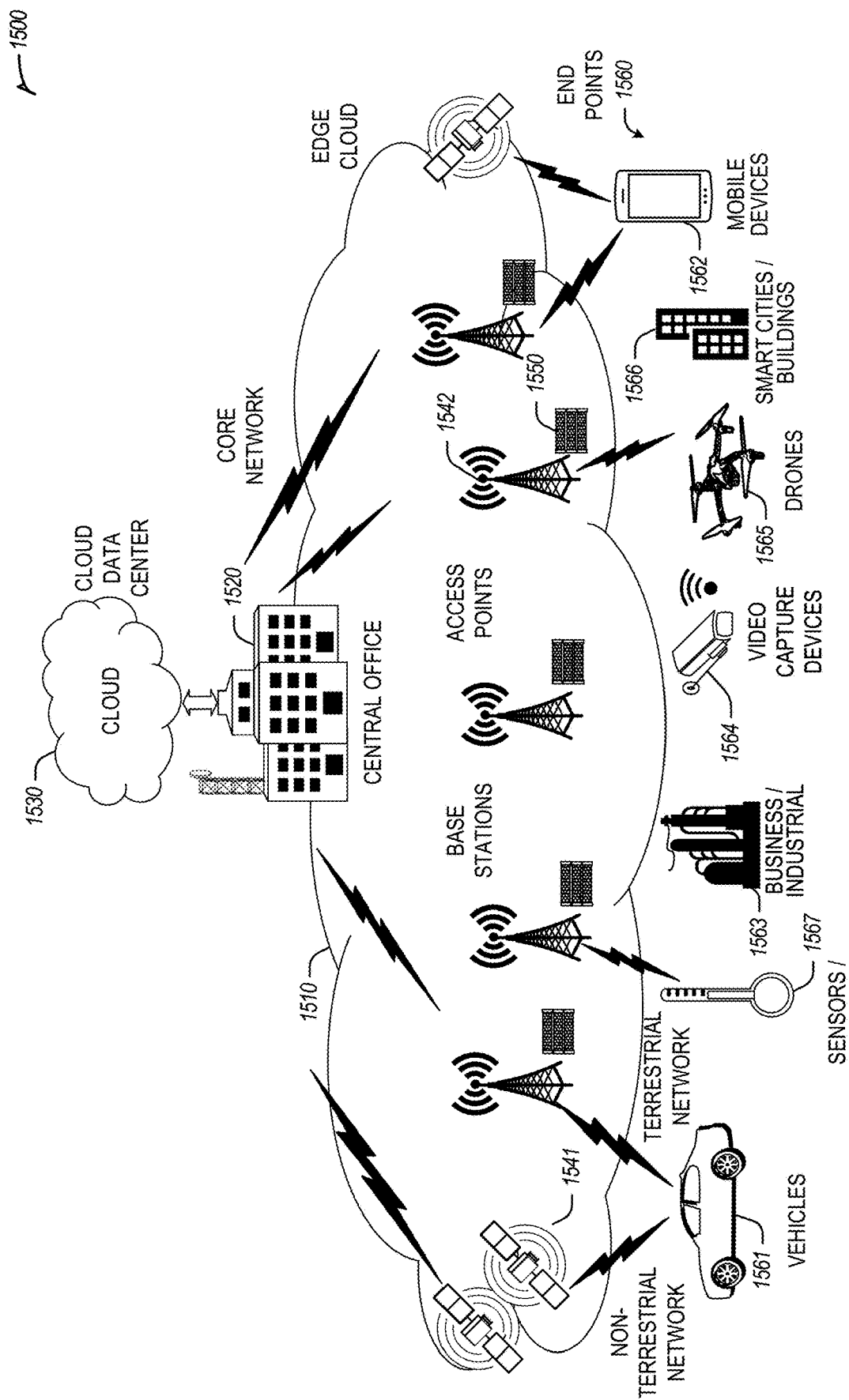
FIG. 15 illustrates an overview of an edge cloud configuration for edge computing, according to an example.

FIG. 15 is a block diagram 1500 showing an overview of a configuration for edge computing, which includes a layer of processing referenced in many of the current examples as an "edge cloud". This network topology, which may include a number of conventional networking layers (including those not shown herein), may be extended through use of the satellite and non-terrestrial network communication arrangements discussed herein.

As shown, the edge cloud 1510 is co-located at an edge location, such as a satellite vehicle 1541, a base station 1542, a local processing hub 1550, or a central office 1520, and thus may include multiple entities, devices, and equipment instances. The edge cloud 1510 is located much closer to the endpoint (consumer and producer) data sources 1560 (e.g., autonomous vehicles 1561, user equipment 1562, business and industrial equipment 1563, video capture devices 1564, drones 1565, smart cities and building devices 1566, sensors and IoT devices 1567, etc.) than the cloud data center 1530. Compute, memory, and storage resources which are offered at the edges in the edge cloud 1510 are critical to providing ultra-low or improved latency response times for services and functions used by the endpoint data sources 1560 as well as reduce network backhaul traffic from the edge cloud 1510 toward cloud data center 1530 thus improving energy consumption and overall network usages among other benefits.

Compute, memory, and storage are scarce resources, and generally decrease depending on the edge location (e.g., fewer processing resources being available at consumer endpoint devices than at a base station or at a central office). However, the closer that the edge location is to the endpoint (e.g., UEs), the more that space and power is constrained. Thus, edge computing, as a general design principle, attempts to minimize the amount of resources needed for network services, through the distribution of more resources which are located closer both geographically and in network access time. In the scenario of non-terrestrial network, distance and latency may be far to and from the satellite, but data processing may be better accomplished at edge computing hardware in the satellite vehicle rather requiring additional data connections and network backhaul to and from the cloud.

In an example, an edge cloud architecture extends beyond typical deployment limitations to address restrictions that some network operators or service providers may have in their own infrastructures. These include, variation of configurations based on the edge location (because edges at a base station level, for instance, may have more constrained performance); configurations based on the type of compute, memory, storage, fabric, acceleration, or like resources available to edge locations, tiers of locations, or groups of locations; the service, security, and management and orchestration capabilities; and related objectives to achieve usability and performance of end services.

Edge computing is a developing paradigm where computing is performed at or closer to the "edge" of a network, typically through the use of a compute platform implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices. Likewise, within edge computing deployments, there may be scenarios in services which the compute resource may be "moved" to the data, as well as scenarios in which the data may be "moved" to the compute resource. Or as an example, base station (or satellite vehicle) compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

In contrast to the network architecture of FIG. 15, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage, but is not optimal for highly time varying data, such as a collision, traffic light change, etc. and may fail in attempting to meet latency challenges. The extension of satellite capabilities within an edge computing network provides even more possible permutations of managing compute, data, bandwidth, resources, service levels, and the like.

Depending on the real-time requirements in a communications context, a hierarchical structure of data processing and storage nodes may be defined in an edge computing deployment involving satellite connectivity. For example, such a deployment may include local ultra-low-latency processing, regional storage and processing as well as remote cloud data center based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data center.

Figure 16:
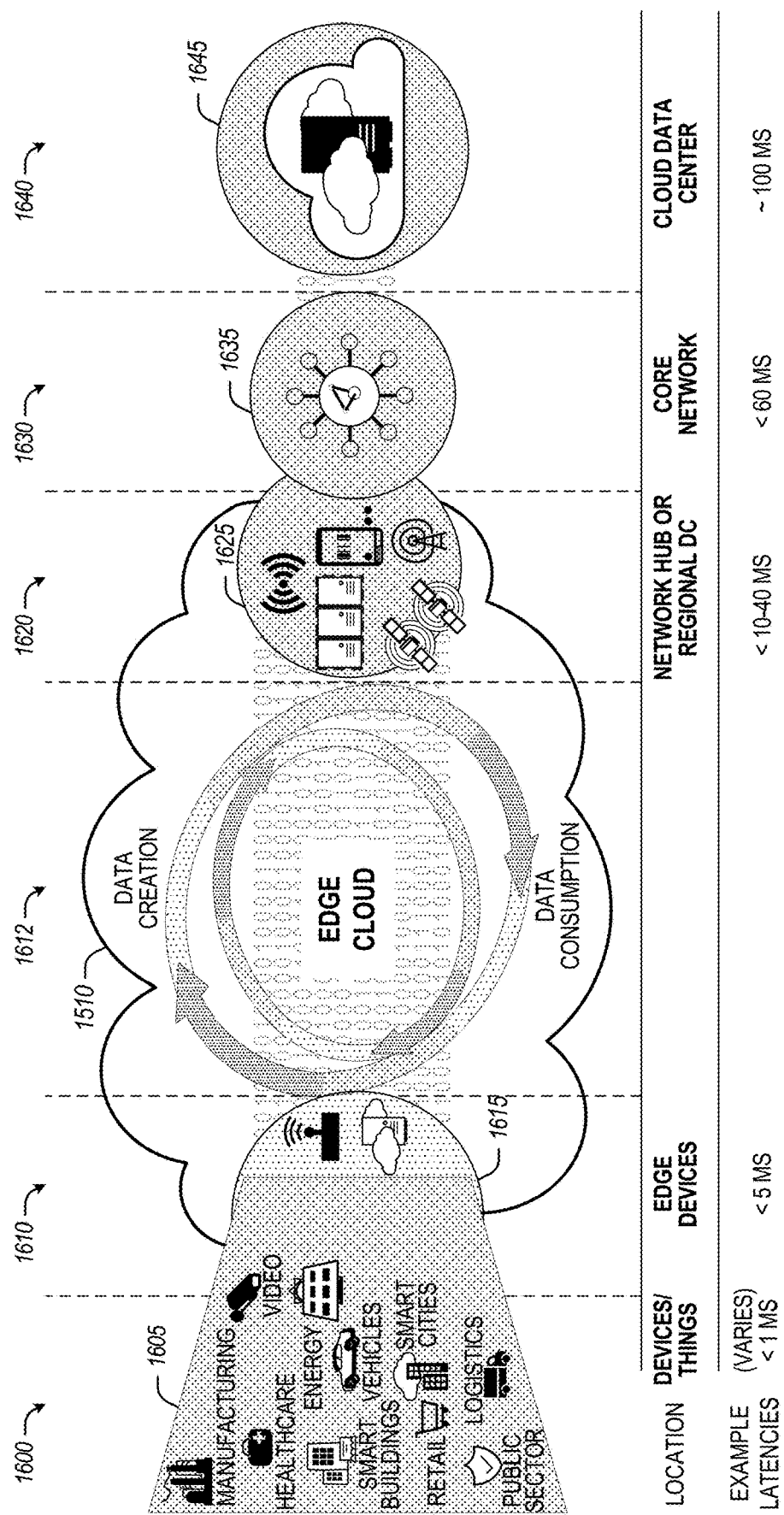
FIG. 16 illustrates an overview of layers of distributed compute deployed among an edge computing system, according to an example.

FIG. 16 illustrates operational layers among endpoints, an edge cloud, and cloud computing environments. Specifically, FIG. 16 depicts examples of computational use cases 1605, utilizing the edge cloud 1510 among multiple illustrative layers of network computing. The layers begin at an endpoint (devices and things) layer 1600, which accesses the edge cloud 1510 to conduct data creation, analysis, and data consumption activities. The edge cloud 1510 may span multiple network layers, such as an edge devices layer 1610 having gateways, on-premise servers, or network equipment (nodes 1615) located in physically proximate edge systems; a network access layer 1620, encompassing base stations, radio processing units, network hubs, regional data centers (DC), or local network equipment (equipment 1625); and any equipment, devices, or nodes located therebetween (in layer 1612, not illustrated in detail). The network communications within the edge cloud 1510 and among the various layers may occur via any number of wired or wireless mediums, including via connectivity architectures and technologies not depicted.

Examples of latency with terrestrial networks, resulting from network communication distance and processing time constraints, may range from less than a millisecond (ms) when among the endpoint layer 1600, under 5 ms at the edge devices layer 1610, to even between 10 to 40 ms when communicating with nodes at the network access layer 1620. (Variation to these latencies is expected with use of non-terrestrial networks). Beyond the edge cloud 1510 are core network and cloud data center layers 1630 and 1640, each with increasing latency (e.g., between 50-60 ms at the core network layer 1630, to 100 or more ms at the cloud data center layer). As a result, operations at a core network data center 1635 or a cloud data center 1645, with latencies of at least 50 to 100 ms or more, will not be able to accomplish many time-critical functions of the use cases 1605. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 1635 or a cloud data center 1645, a central office or content data network may be considered as being located within a "near edge" layer ("near" to the cloud, having high latency values when communicating with the devices and endpoints of the use cases 1605), whereas an access point, base station, on-premise server, or network gateway may be considered as located within a "far edge" layer ("far" from the cloud, having low latency values when communicating with the devices and endpoints of the use cases 1605). It will be understood that other categorizations of a particular network layer as constituting a "close", "local", "near", "middle", or "far" edge may be based on latency, distance, number of network hops, or other measurable characteristics, as measured from a source in any of the network layers 1600-1640.

The various use cases 1605 may access resources under usage pressure from incoming streams, due to multiple services utilizing the edge cloud. To achieve results with low latency, the services executed within the edge cloud 1510 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, work-flows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 1510 may provide the ability to serve and respond to multiple applications of the use cases 1605 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), etc.), which cannot leverage conventional cloud computing due to latency or other limitations. This is especially relevant for applications which require connection via satellite, and the additional latency that trips via satellite may require to the cloud.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 1510 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 1510 (network layers 1600-1640), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, circuitry, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 1510.

As such, the edge cloud 1510 is formed from network components and functional features operated by and within edge gateway nodes, edge aggregation nodes, or other edge compute nodes among network layers 1610-1630. The edge cloud 1510 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 1510 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 1510 may be servers, multi-tenant servers, appliance computing devices, and/or any other type of computing devices. For example, a node of the edge cloud 1510 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 19B. The edge cloud 1510 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 17:
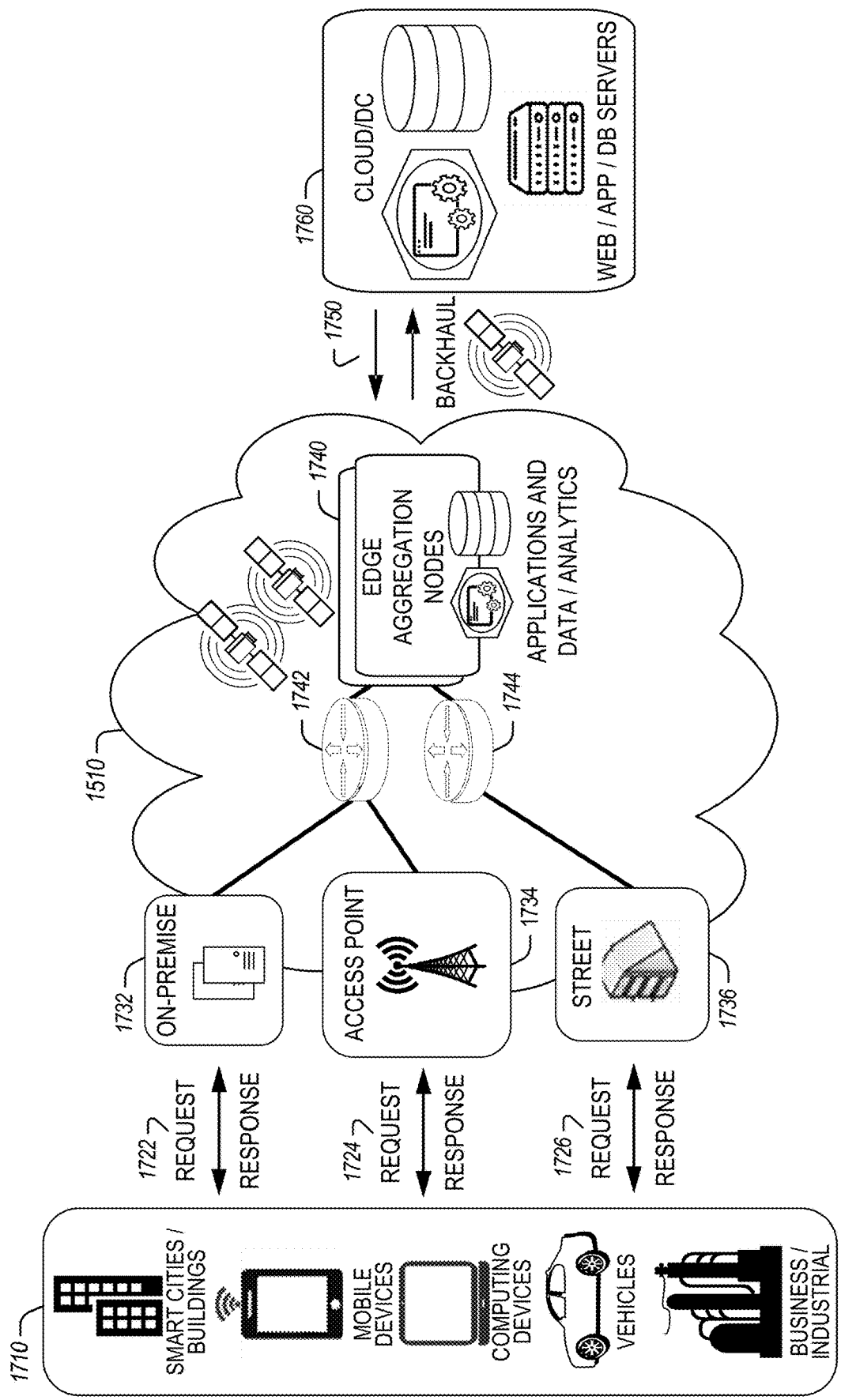
FIG. 17 illustrates operational layers among endpoints, an edge cloud, and cloud computing environments.

In FIG. 17, various client endpoints 1710 (in the form of mobile devices, computers, autonomous vehicles, business computing equipment, industrial processing equipment) exchange requests and responses that are specific to the type of endpoint network aggregation. For instance, client endpoints 1710 may obtain network access via a wired broadband network, by exchanging requests and responses 1722 through an on-premise network system 1732. Some client endpoints 1710, such as mobile computing devices, may obtain network access via a wireless broadband network, by exchanging requests and responses 1724 through an access point (e.g., cellular network tower) 1734. Some client endpoints 1710, such as autonomous vehicles may obtain network access for requests and responses 1726 via a wireless vehicular network through a street-located network system 1736. However, regardless of the type of network access, the TSP may deploy aggregation points 1742, 1744 within the edge cloud 1510 to aggregate traffic and requests. Thus, within the edge cloud 1510, the TSP may deploy various compute and storage resources, such as at edge aggregation nodes 1740 (including those located at satellite vehicles), to provide requested content. The edge aggregation nodes 1740 and other systems of the edge cloud 1510 are connected to a cloud or data center 1760, which uses a backhaul network 1750 (such as a satellite backhaul) to fulfill higher-latency requests from a cloud/data center for websites, applications, database servers, etc. Additional or consolidated instances of the edge aggregation nodes 1740 and the aggregation points 1742, 1744, including those deployed on a single server framework, may also be present within the edge cloud 1510 or other areas of the TSP infrastructure.

At a more generic level, an edge computing system may be described to encompass any number of deployments operating in the edge cloud 1510, which provide coordination from client and distributed computing devices. FIG. 16 provides a further abstracted overview of layers of distributed compute deployed among an edge computing environment for purposes of illustration.

Figure 18:
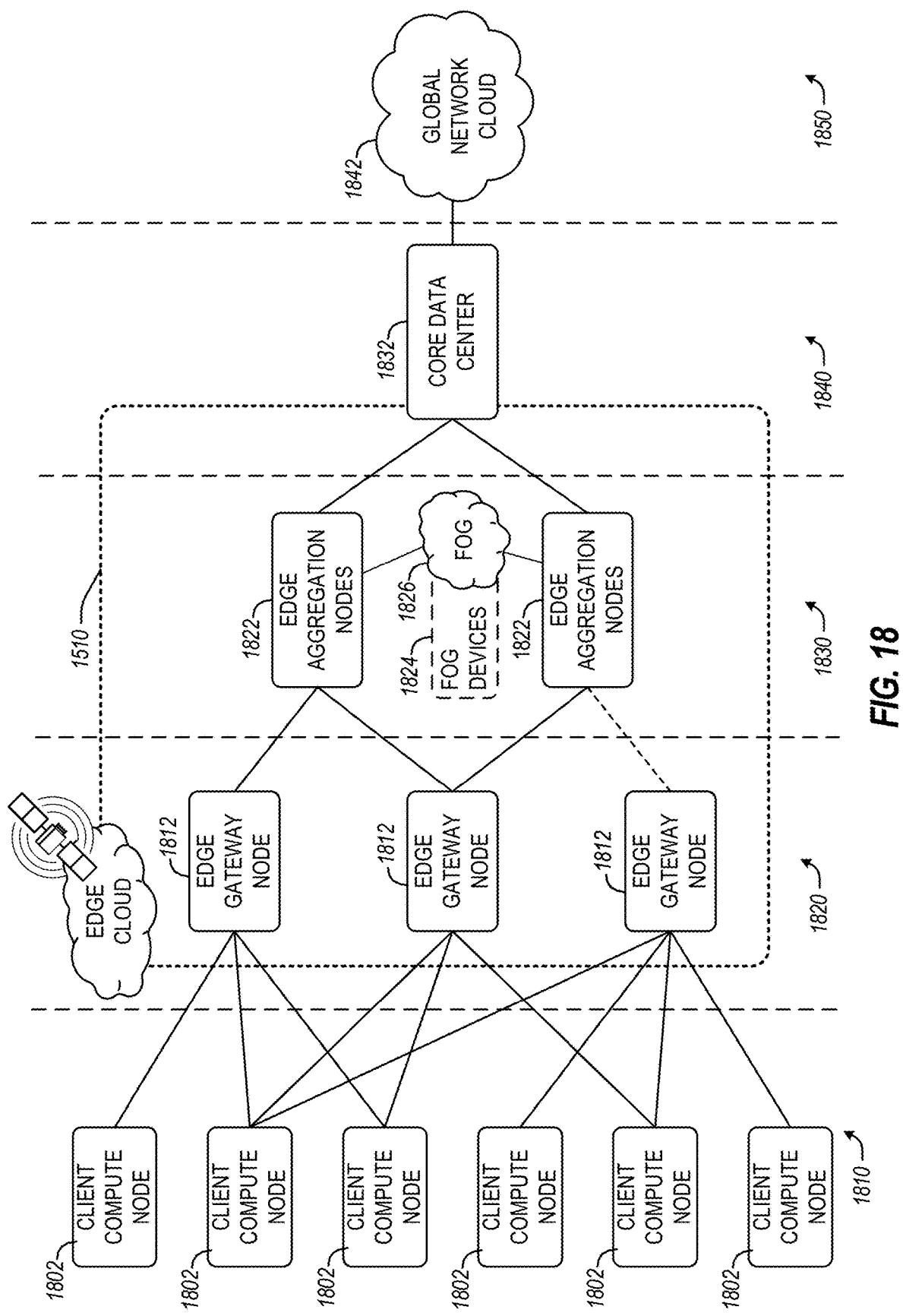
FIG. 18 illustrates an example approach for networking and services in an edge computing system.

FIG. 18 generically depicts an edge computing system for providing edge services and applications to multi-stakeholder entities, as distributed among one or more client compute nodes 1802, one or more edge gateway nodes 1812, one or more edge aggregation nodes 1822, one or more core data centers 1832, and a global network cloud 1842, as distributed across layers of the network. The implementation of the edge computing system may be provided at or on behalf of a telecommunication service provider ("telco", or "TSP"), internet-of-things service provider, cloud service provider (CSP), enterprise entity, or any other number of entities.

Each node or device of the edge computing system is located at a particular layer corresponding to layers 1600, 1610, 1620, 1630, 1640. For example, the client compute nodes 1802 are each located at an endpoint layer 1600, while each of the edge gateway nodes 1812 are located at an edge devices layer 1610 (local level) of the edge computing system. Additionally, each of the edge aggregation nodes 1822 (and/or fog devices 1824, if arranged or operated with or among a fog networking configuration 1826) are located at a network access layer 1620 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein are applicable to fog networks, fogging, and fog configurations. Further, aspects of the edge computing systems discussed herein may be configured as a fog, or aspects of a fog may be integrated into an edge computing architecture.

The core data center 1832 is located at a core network layer 1630 (e.g., a regional or geographically-central level), while the global network cloud 1842 is located at a cloud data center layer 1640 (e.g., a national or global layer). The use of "core" is provided as a term for a centralized network location—deeper in the network—which is accessible by multiple edge nodes or components; however, a "core" does not necessarily designate the "center" or the deepest location of the network. Accordingly, the core data center 1832 may be located within, at, or near the edge cloud 1510.

Although an illustrative number of client compute nodes 1802, edge gateway nodes 1812, edge aggregation nodes 1822, core data centers 1832, global network clouds 1842 are shown in FIG. 18, it should be appreciated that the edge computing system may include more or fewer devices or systems at each layer. Additionally, as shown in FIG. 18, the number of components of each layer 1600, 1610, 1620, 1630, 1640 generally increases at each lower level (i.e., when moving closer to endpoints). As such, one edge gateway node 1812 may service multiple client compute nodes 1802, and one edge aggregation node 1822 may service multiple edge gateway nodes 1812.

Consistent with the examples provided herein, each client compute node 1802 may be embodied as any type of end point component, device, appliance, or "thing" capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 1510.

As such, the edge cloud 1510 is formed from network components and functional features operated by and within the edge gateway nodes 1812 and the edge aggregation nodes 1822 of layers 1620, 1630, respectively. The edge cloud 1510 may be embodied as any type of network that provides edge computing and/or storage resources which are proximately located to radio access network (RAN) capable endpoint devices (e.g., mobile computing devices, IoT devices, smart devices, etc.), which are shown in FIG. 16 as the client compute nodes 1802. In other words, the edge cloud 1510 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 1510 may form a portion of or otherwise provide an ingress point into or across a fog networking configuration 1826 (e.g., a network of fog devices 1824, not shown in detail), which may be embodied as a system-level horizontal and distributed architecture that distributes resources and services to perform a specific function. For instance, a coordinated and distributed network of fog devices 1824 may perform computing, storage, control, or networking aspects in the context of an IoT system arrangement. Other networked, aggregated, and distributed functions may exist in the edge cloud 1510 between the cloud data center layer 1640 and the client endpoints (e.g., client compute nodes 1802). Some of these are discussed in the following sections in the context of network functions or service virtualization, including the use of virtual edges and virtual services which are orchestrated for multiple stakeholders.

The edge gateway nodes 1812 and the edge aggregation nodes 1822 cooperate to provide various edge services and security to the client compute nodes 1802. Furthermore, because each client compute node 1802 may be stationary or mobile, each edge gateway node 1812 may cooperate with other edge gateway devices to propagate presently provided edge services and security as the corresponding client compute node 1802 moves about a region. To do so, each of the edge gateway nodes 1812 and/or edge aggregation nodes 1822 may support multiple tenancy and multiple stakeholder configurations, in which services from (or hosted for) multiple service providers and multiple consumers may be supported and coordinated across a single or multiple compute devices.

In further examples, any of the compute nodes or devices discussed with reference to the present computing systems and environment may be fulfilled based on the components depicted in FIGS. 19A and 19B. Each compute node may be embodied as a type of device, appliance, computer, or other "thing" capable of communicating with other edge, networking, or endpoint components.

Figure 19A:
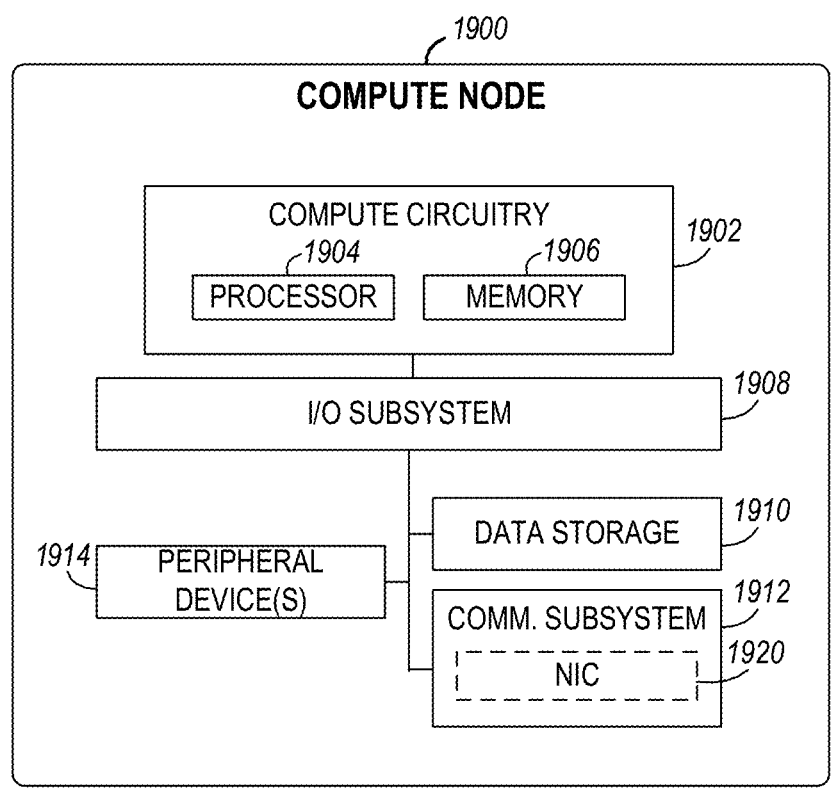
FIG. 19A illustrates an overview of example components deployed at a compute node system, according to an example.

In the simplified example depicted in FIG. 19A, an edge compute node 1900 includes a compute engine (also referred to herein as "compute circuitry") 1902, an input/output (I/O) subsystem 1908, data storage 1910, a communication circuitry subsystem 1912, and, optionally, one or more peripheral devices 1914. In other examples, each compute device may include other or additional components, such as those used in personal or server computing systems (e.g., a display, peripheral devices, etc.). Additionally, in some examples, one or more of the illustrative components may be incorporated in, or otherwise form a portion of, another component.

The compute node 1900 may be embodied as any type of engine, device, or collection of devices capable of performing various compute functions. In some examples, the compute node 1900 may be embodied as a single device such as an integrated circuit, an embedded system, a field-programmable gate array (FPGA), a system-on-a-chip (SOC), or other integrated system or device. In the illustrative example, the compute node 1900 includes or is embodied as a processor 1904 and a memory 1906. The processor 1904 may be embodied as any type of processor capable of performing the functions described herein (e.g., executing an application). For example, the processor 1904 may be embodied as a multi-core processor(s), a microcontroller, or other processor or processing/controlling circuit. In some examples, the processor 1904 may be embodied as, include, or be coupled to an FPGA, an application specific integrated circuit (ASIC), reconfigurable hardware or hardware circuitry, or other specialized hardware to facilitate performance of the functions described herein.

The main memory 1906 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three-dimensional crosspoint memory device (e.g., Intel 3D XPoint™ memory, other storage class memory), or other byte addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 1906 may be integrated into the processor 1904. The main memory 1906 may store various software and data used during operation such as one or more applications, data operated on by the application(s), libraries, and drivers.

The compute circuitry 1902 is communicatively coupled to other components of the compute node 1900 via the I/O subsystem 1908, which may be embodied as circuitry and/or components to facilitate input/output operations with the compute circuitry 1902 (e.g., with the processor 1904 and/or the main memory 1906) and other components of the compute circuitry 1902. For example, the I/O subsystem 1908 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1908 may form a portion of a system-on-a-chip (SoC) and be incorporated, along with one or more of the processor 1904, the main memory 1906, and other components of the compute circuitry 1902, into the compute circuitry 1902.

The one or more illustrative data storage devices 1910 may be embodied as any type of devices configured for short-term or long-term storage of data such as, for example, memory devices and circuits, memory cards, hard disk drives, solid-state drives, or other data storage devices. Each data storage device 1910 may include a system partition that stores data and firmware code for the data storage device 1910. Each data storage device 1910 may also include one or more operating system partitions that store data files and executables for operating systems depending on, for example, the type of compute node 1900.

The communication circuitry 1912 may be embodied as any communication circuit, device, or collection thereof, capable of enabling communications over a network between the compute circuitry 1902 and another compute device (e.g., an edge gateway node 1812 of an edge computing system). The communication circuitry 1912 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, etc.) to effect such communication.

The illustrative communication circuitry 1912 includes a network interface controller (NIC) 1920, which may also be referred to as a host fabric interface (HFI). The NIC 1920 may be embodied as one or more add-in-boards, daughter cards, network interface cards, controller chips, chipsets, or other devices that may be used by the compute node 1900 to connect with another compute device (e.g., an edge gateway node 1812). In some examples, the NIC 1920 may be embodied as part of a system-on-a-chip (SoC) that includes one or more processors, or included on a multichip package that also contains one or more processors. In some examples, the NIC 1920 may include a local processor (not shown) and/or a local memory (not shown) that are both local to the NIC 1920. In such examples, the local processor of the NIC 1920 may be capable of performing one or more of the functions of the compute circuitry 1902 described herein. Additionally or alternatively, in such examples, the local memory of the NIC 1920 may be integrated into one or more components of the client compute node at the board level, socket level, chip level, and/or other levels.

Additionally, in some examples, each compute node 1900 may include one or more peripheral devices 1914. Such peripheral devices 1914 may include any type of peripheral device found in a compute device or server such as audio input devices, a display, other input/output devices, interface devices, and/or other peripheral devices, depending on the particular type of the compute node 1900. In further examples, the compute node 1900 may be embodied by a respective edge compute node in an edge computing system (e.g., client compute node 1802, edge gateway node 1812, edge aggregation node 1822) or like forms of appliances, computers, subsystems, circuitry, or other components.

Figure 19B:
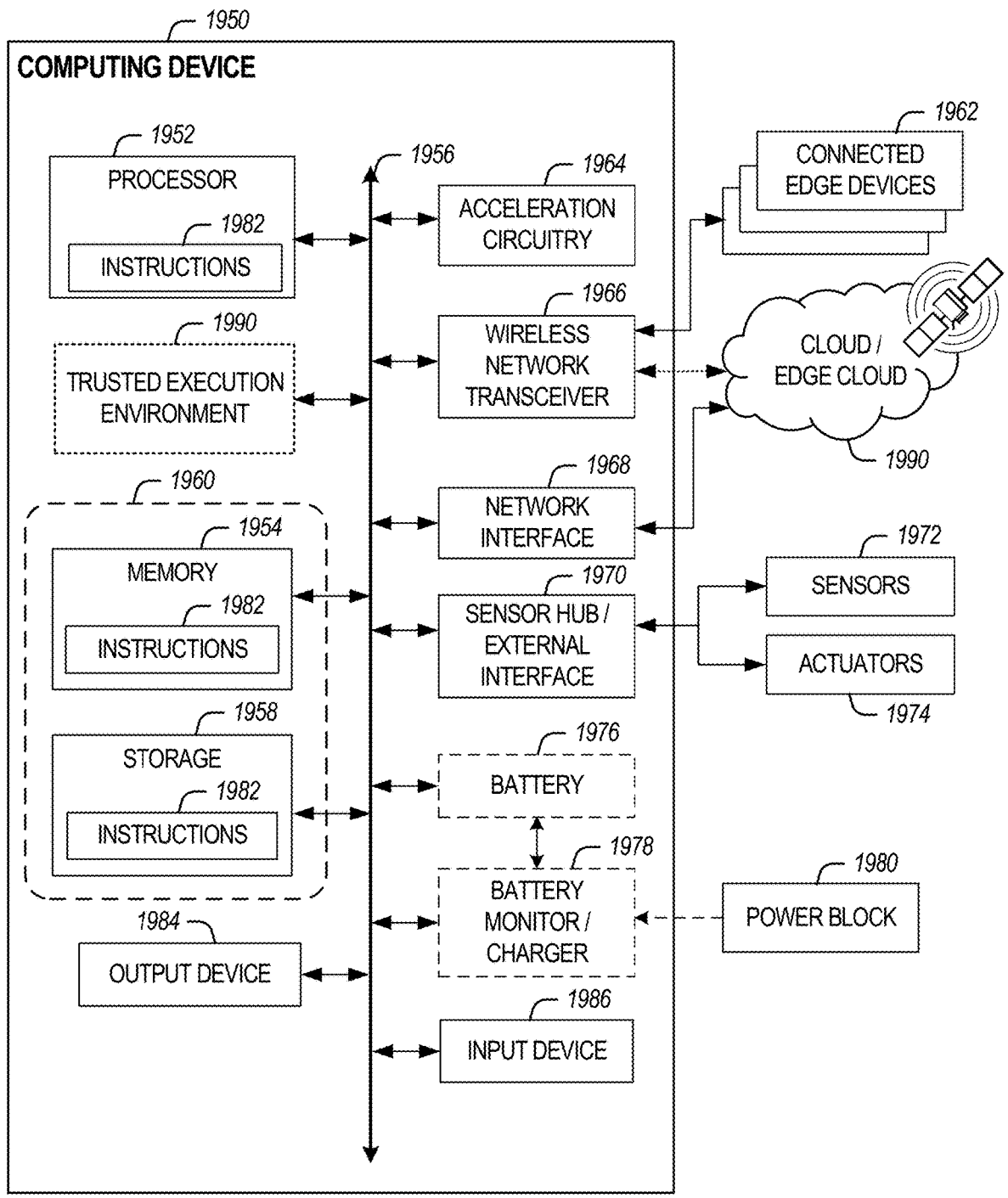
FIG. 19B illustrates a further overview of example components within a computing device, according to an example.

In a more detailed example, FIG. 19B illustrates a block diagram of an example of components that may be present in an edge computing node 1950 for implementing the techniques (e.g., operations, processes, methods, and methodologies) described herein. The edge computing node 1950 may include any combinations of the components referenced above, and it may include any device usable with an edge communication network or a combination of such networks. The components may be implemented as ICs, portions thereof, discrete electronic devices, or other modules, logic, hardware, software, firmware, or a combination thereof adapted in the edge computing node 1950, or as components otherwise incorporated within a chassis of a larger system. Further, to support the security examples provided herein, a hardware RoT (e.g., provided according to a DICE architecture) may be implemented in each IP block of the edge computing node 1950 such that any IP Block may boot into a mode where a RoT identity may be generated that may attest its identity and its current booted firmware to another IP Block or to an external entity.

The edge computing node 1950 may include processing circuitry in the form of a processor 1952, which may be a microprocessor, a multi-core processor, a multithreaded processor, an ultra-low voltage processor, an embedded processor, or other known processing elements. The processor 1952 may be a part of a system on a chip (SoC) in which the processor 1952 and other components are formed into a single integrated circuit, or a single package, such as the Edison™ or Galileo™ SoC boards from Intel Corporation, Santa Clara, Calif. As an example, the processor 1952 may include an Intel® Architecture Core™ based processor, such as a Quark™, an Atom™, a Xeon™ an i3, an i5, an i7, an i9, or an MCU-class processor, or another such processor available from Intel®. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc.

The processor 1952 may communicate with a system memory 1954 over an interconnect 1956 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1958 may also couple to the processor 1952 via the interconnect 1956. In an example, the storage 1958 may be implemented via a solid-state disk drive (SSDD). Other devices that may be used for the storage 1958 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magneto-resistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1958 may be on-die memory or registers associated with the processor 1952. However, in some examples, the storage 1958 may be implemented using a micro hard disk drive (HDD). Further, any number of new technologies may be used for the storage 1958 in addition to, or instead of, the technologies described, such resistance change memories, phase change memories, holographic memories, or chemical memories, among others.

The components may communicate over the interconnect 1956. The interconnect 1956 may include any number of technologies, including industry standard architecture (ISA), extended ISA (EISA), peripheral component interconnect (PCI), peripheral component interconnect extended (PCIx), PCI express (PCIe), NVLink, or any number of other technologies. The interconnect 1956 may be a proprietary bus, for example, used in an SoC based system. Other bus systems may be included, such as an I2C interface, an SPI interface, point to point interfaces, and a power bus, among others.

The interconnect 1956 may couple the processor 1952 to a transceiver 1966, for communications with the connected edge devices 1962. The transceiver 1966 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1962. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1966 (or multiple transceivers) may communicate using multiple standards or radios for communications at a different range. For example, the edge computing node 1950 may communicate with close devices, e.g., within about 10 meters, using a local transceiver based on BLE, or another low power radio, to save power. More distant connected edge devices 1962, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee.

A wireless network transceiver 1966 (e.g., a radio transceiver) may be included to communicate with devices or services in the edge cloud 1990 via local or wide area network protocols. The wireless network transceiver 1966 may be an LPWA transceiver that follows the IEEE 802.15.4, or IEEE 802.15.4g standards, among others. The edge computing node 1950 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1966, as described herein. For example, the transceiver 1966 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1966 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1968 may be included to provide a wired communication to nodes of the edge cloud 1990 or to other devices, such as the connected edge devices 1962 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1968 may be included to enable connecting to a second network, for example, a first NIC 1968 providing communications to the cloud over Ethernet, and a second NIC 1968 providing communications to other devices over another type of network.

Given the variety of types of applicable communications from the device to another component or network, applicable communications circuitry used by the device may include or be embodied by any one or more of components 1964, 1966, 1968, or 1970. Accordingly, in various examples, applicable means for communicating (e.g., receiving, transmitting, etc.) may be embodied by such communications circuitry.

The edge computing node 1950 may include or be coupled to acceleration circuitry 1964, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 1956 may couple the processor 1952 to a sensor hub or external interface 1970 that is used to connect additional devices or subsystems. The devices may include sensors 1972, such as accelerometers, level sensors, flow sensors, optical light sensors, camera sensors, temperature sensors, a global positioning system (GPS) sensors, pressure sensors, barometric pressure sensors, and the like. The hub or interface 1970 further may be used to connect the edge computing node 1950 to actuators 1974, such as power switches, valve actuators, an audible sound generator, a visual warning device, and the like.

In some optional examples, various input/output (I/O) devices may be present within or connected to, the edge computing node 1950. For example, a display or other output device 1984 may be included to show information, such as sensor readings or actuator position. An input device 1986, such as a touch screen or keypad may be included to accept input. An output device 1984 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 1950.

A battery 1976 may power the edge computing node 1950, although, in examples in which the edge computing node 1950 is mounted in a fixed location, it may have a power supply coupled to an electrical grid. The battery 1976 may be a lithium ion battery, or a metal-air battery, such as a zinc-air battery, an aluminum-air battery, a lithium-air battery, and the like.

A battery monitor/charger 1978 may be included in the edge computing node 1950 to track the state of charge (SoCh) of the battery 1976. The battery monitor/charger 1978 may be used to monitor other parameters of the battery 1976 to provide failure predictions, such as the state of health (SoH) and the state of function (SoF) of the battery 1976. The battery monitor/charger 1978 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1978 may communicate the information on the battery 1976 to the processor 1952 over the interconnect 1956. The battery monitor/charger 1978 may also include an analog-to-digital (ADC) converter that enables the processor 1952 to directly monitor the voltage of the battery 1976 or the current flow from the battery 1976. The battery parameters may be used to determine actions that the edge computing node 1950 may perform, such as transmission frequency, mesh network operation, sensing frequency, and the like.

A power block 1980, or other power supply coupled to a grid, may be coupled with the battery monitor/charger 1978 to charge the battery 1976. In some examples, the power block 1980 may be replaced with a wireless power receiver to obtain the power wirelessly, for example, through a loop antenna in the edge computing node 1950. A wireless battery charging circuit, such as an LTC4020 chip from Linear Technologies of Milpitas, Calif., among others, may be included in the battery monitor/charger 1978. The specific charging circuits may be selected based on the size of the battery 1976, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1958 may include instructions 1982 in the form of software, firmware, or hardware commands to implement the techniques described herein. Although such instructions 1982 are shown as code blocks included in the memory 1954 and the storage 1958, it may be understood that any of the code blocks may be replaced with hardwired circuits, for example, built into an application specific integrated circuit (ASIC).

In an example, the instructions 1982 provided via the memory 1954, the storage 1958, or the processor 1952 may be embodied as a non-transitory, machine-readable medium 1960 including code to direct the processor 1952 to perform electronic operations in the edge computing node 1950. The processor 1952 may access the non-transitory, machine-readable medium 1960 over the interconnect 1956. For instance, the non-transitory, machine-readable medium 1960 may be embodied by devices described for the storage 1958 or may include specific storage units such as optical disks, flash drives, or any number of other hardware devices. The non-transitory, machine-readable medium 1960 may include instructions to direct the processor 1952 to perform a specific sequence or flow of actions, for example, as described with respect to the flowchart(s) and block diagram(s) of operations and functionality depicted above. As used in, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Each of the block diagrams of FIGS. 19A and 19B are intended to depict a high-level view of components of a device, subsystem, or arrangement of an edge computing node. However, it will be understood that some of the components shown may be omitted, additional components may be present, and a different arrangement of the components shown may occur in other implementations.

Figure 20:
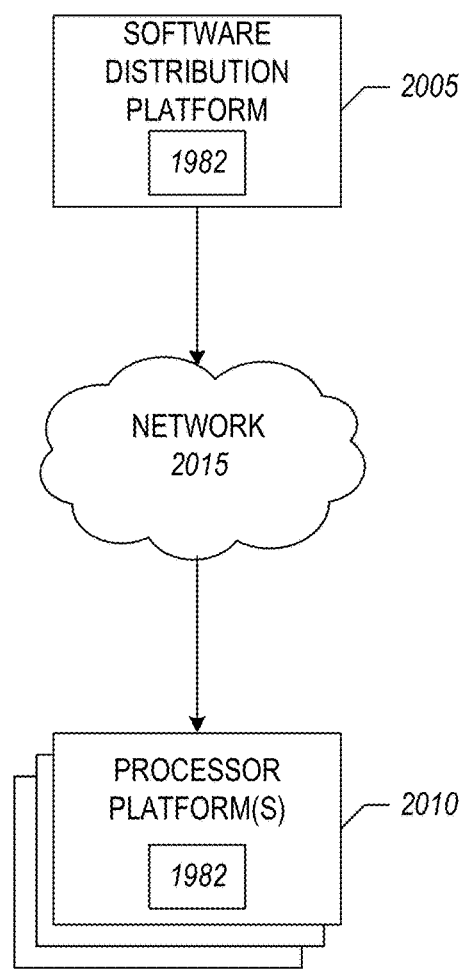
FIG. 20 illustrates a software distribution platform to distribute software instructions and derivatives, according to an example.

FIG. 20 illustrates an example software distribution platform 2005 to distribute software, such as the example computer readable instructions 1982 of FIG. 19B, to one or more devices, such as example processor platform(s) 2010 and/or other example connected edge devices or systems discussed herein. The example software distribution platform 2005 may be implemented by any computer server, data facility, cloud service, etc., capable of storing and transmitting software to other computing devices. Example connected edge devices may be customers, clients, managing devices (e.g., servers), third parties (e.g., customers of an entity owning and/or operating the software distribution platform 2005). Example connected edge devices may operate in commercial and/or home automation environments. In some examples, a third party is a developer, a seller, and/or a licensor of software such as the example computer readable instructions 1982 of FIG. 19B. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 20, the software distribution platform 2005 includes one or more servers and one or more storage devices that store the computer readable instructions 1982. The one or more servers of the example software distribution platform 2005 are in communication with a network 2015, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 1982 from the software distribution platform 2005. For example, the software, which may correspond to example computer readable instructions, may be downloaded to the example processor platform(s), which is/are to execute the computer readable instructions 1982. In some examples, one or more servers of the software distribution platform 2005 are communicatively connected to one or more security domains and/or security devices through which requests and transmissions of the example computer readable instructions 1982 must pass. In some examples, one or more servers of the software distribution platform 2005 periodically offer, transmit, and/or force updates to the software (e.g., the example computer readable instructions 1982 of FIG. 19B) to ensure improvements, patches, updates, etc. are distributed and applied to the software at the end user devices.

In the illustrated example of FIG. 20, the computer readable instructions 1982 are stored on storage devices of the software distribution platform 2005 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 1982 stored in the software distribution platform 2005 are in a first format when transmitted to the example processor platform(s) 2010. In some examples, the first format is an executable binary in which particular types of the processor platform(s) 2010 can execute. However, in some examples, the first format is uncompiled code that requires one or more preparation tasks to transform the first format to a second format to enable execution on the example processor platform(s) 2010. For instance, the receiving processor platform(s) 2000 may need to compile the computer readable instructions 1982 in the first format to generate executable code in a second format that is capable of being executed on the processor platform(s) 2010. In still other examples, the first format is interpreted code that, upon reaching the processor platform(s) 2010, is interpreted by an interpreter to facilitate execution of instructions.

USE CASES AND ADDITIONAL EXAMPLES

In the examples above, many references were provided to low-Earth orbit (LEO) satellites and constellations. However, it will be understood that the examples above are also relevant to many forms of middle-Earth orbit satellites and constellations, geosynchronous orbit satellites and constellations, and other high altitude communication platforms such as balloons, drones, airships and blimps, etc. Thus, it will be understood that the techniques discussed for LEO network settings are also applicable to many other network settings.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 is a computing system, comprising: processing circuitry; and a memory device including instructions embodied thereon, wherein the instructions, which when executed by the processing circuitry, configure the processing circuitry to perform operations that: obtain network routing data and telemetry data associated with network communication paths in a low-earth orbit (LEO) satellite constellation (e.g., a constellation of a first satellite group or network); identify a condition to change control of the network communication paths of the LEO satellite constellation, based on the network routing data and the telemetry data; and communicate at least one command to a non-terrestrial network operations center (NOC) that causes the non-terrestrial NOC to control the network communication paths of the LEO satellite constellation (e.g., at a non-terrestrial NOC that is located in a second satellite group or network that operates independently from the LEO satellite constellation).

In Example 2, the subject matter of Example 1 optionally includes subject matter where the computing system is implemented as a terrestrial NOC located at a terrestrial data center, and wherein the non-terrestrial NOC is capable to perform operations that were previously performed by the terrestrial NOC.

In Example 3, the subject matter of Example 2 optionally includes subject matter where the at least one command causes the non-terrestrial NOC to take over control of Mission Planning and Scheduling (MPS) operations of the LEO satellite constellation from the terrestrial NOC.

In Example 4, the subject matter of Example 3 optionally includes subject matter where the control of the network communication paths of the LEO satellite constellation is based on MPS routing data provided from the terrestrial NOC to the non-terrestrial NOC.

In Example 5, the subject matter of any one or more of Examples 1-4 optionally includes subject matter where the network communication paths are provided using a plurality of inter-satellite links in the LEO satellite constellation, and wherein the at least one command causes the non-terrestrial NOC to control the network communication paths of the LEO satellite constellation including to change network routing among the plurality of inter-satellite links.

In Example 6, the subject matter of Example 5 optionally includes subject matter where the control of the network communication paths of the LEO satellite constellation relates to: uplink routing, downlink routing, uplink frequency, downlink frequency, or use of fore, aft, right, or left satellite antennas of respective satellite vehicles.

In Example 7, the subject matter of any one or more of Examples 1-6 optionally includes subject matter where the condition is identified based on at least one characteristic indicated in the telemetry data, the at least one characteristic relating to: battery power levels, antenna health, or synchronization state.

In Example 8, the subject matter of any one or more of Examples 1-7 optionally includes subject matter where the condition is identified based on at least one rule for operation of the network communication paths in the LEO satellite constellation, the at least one rule relating to: communication frequency, failure conditions, weather conditions, maintenance calculations, or identified events.

In Example 9, the subject matter of any one or more of Examples 1-8 optionally includes subject matter where the at least one command causes the non-terrestrial NOC to control compute processing operations performed for the LEO satellite constellation, and wherein the compute processing operations are coordinated with a terrestrial data center or a non-terrestrial data center.

In Example 10, the subject matter of any one or more of Examples 1-9 optionally includes subject matter where the non-terrestrial NOC is located in a group of one or more satellites in a second orbital plane that differs from a first orbital plane used by the LEO satellite constellation, and wherein the second orbital plane is a medium earth orbital plane, geosynchronous orbital plane, or high earth orbital plane.

Example 11 is a method for configuring satellite networking operations, performed by processing circuitry of a computing device, the method comprising: obtaining network routing data and telemetry data associated with network communication paths in a low-earth orbit (LEO) satellite constellation (e.g., a constellation of a first satellite group or network); identifying a condition to change control of the network communication paths of the LEO satellite constellation, based on the network routing data and the telemetry data; and communicating at least one command to a non-terrestrial network operations center (NOC) that causes the non-terrestrial NOC to control the network communication paths of the LEO satellite constellation (e.g., at a non-terrestrial NOC that is located in a second satellite group or network that operates independently from the LEO satellite constellation).

In Example 12, the subject matter of Example 11 optionally includes subject matter where the method is performed by a terrestrial NOC located at a terrestrial data center, and wherein the non-terrestrial NOC is capable to perform operations that were previously performed by the terrestrial NOC.

In Example 13, the subject matter of Example 12 optionally includes subject matter where the at least one command causes the non-terrestrial NOC to take over control of Mission Planning and Scheduling (MPS) operations of the LEO satellite constellation from the terrestrial NOC.

In Example 14, the subject matter of Example 13 optionally includes communicating MPS routing data from the terrestrial NOC to the non-terrestrial NOC.

In Example 15, the subject matter of any one or more of Examples 11-14 optionally includes subject matter where the network communication paths are provided using a plurality of inter-satellite links in the LEO satellite constellation, and wherein the at least one command causes the non-terrestrial NOC to control the network communication paths of the LEO satellite constellation including to change network routing among the plurality of inter-satellite links.

In Example 16, the subject matter of Example 15 optionally includes subject matter where the control of the network communication paths of the LEO satellite constellation relates to: uplink routing, downlink routing, uplink frequency, downlink frequency, or use of fore, aft, right, or left satellite antennas of respective satellite vehicles.

In Example 17, the subject matter of any one or more of Examples 11-16 optionally includes subject matter where identifying the condition comprises evaluating at least one characteristic indicated in the telemetry data, the at least one characteristic relating to: battery power levels, antenna health, or synchronization state.

In Example 18, the subject matter of any one or more of Examples 11-17 optionally includes subject matter where identifying the condition comprises applying at least one rule for operation of the network communication paths in the LEO satellite constellation, the at least one rule relating to: communication frequency, failure conditions, weather conditions, maintenance calculations, or identified events.

In Example 19, the subject matter of any one or more of Examples 11-18 optionally includes subject matter where the at least one command causes the non-terrestrial NOC to control compute processing operations performed for the LEO satellite constellation, and wherein the compute processing operations are coordinated with a terrestrial data center or a non-terrestrial data center.

In Example 20, the subject matter of any one or more of Examples 11-19 optionally includes subject matter where the non-terrestrial NOC is located in a group of one or more satellites in a second orbital plane that differs from a first orbital plane used by the LEO satellite constellation, and wherein the second orbital plane is a medium earth orbital plane, geosynchronous orbital plane, or high earth orbital plane.

Example 21 is a non-transitory machine-readable storage medium comprising instructions, which when executed by processing circuitry of a computing system, cause the processing circuitry to: obtain network routing data and telemetry data associated with network communication paths in a low-Earth orbit (LEO) satellite constellation (e.g., a constellation of a first satellite group or network); identify a condition to change control of the network communication paths of the LEO satellite constellation, based on the network routing data and the telemetry data; and communicate at least one command to a non-terrestrial network operations center (NOC) that causes the non-terrestrial NOC to control the network communication paths of the LEO satellite constellation (e.g., at a non-terrestrial NOC that is located in a second satellite group or network that operates independently from the LEO satellite constellation).

In Example 22, the subject matter of Example 21 optionally includes subject matter where the computing system is implemented as a terrestrial NOC located at a terrestrial data center, wherein the non-terrestrial NOC is capable to perform operations that were previously performed by a terrestrial NOC.

In Example 23, the subject matter of Example 22 optionally includes subject matter where the at least one command causes the non-terrestrial NOC to take over control of Mission Planning and Scheduling (MPS) operations of the LEO satellite constellation from the terrestrial NOC.

In Example 24, the subject matter of Example 23 optionally includes subject matter where the control of the network communication paths of the LEO satellite constellation is based on MPS routing data provided from the terrestrial NOC to the non-terrestrial NOC.

In Example 25, the subject matter of any one or more of Examples 21-24 optionally includes subject matter where the network communication paths are provided using a plurality of inter-satellite links in the LEO satellite constellation, and wherein the at least one command causes the non-terrestrial NOC to control the network communication paths of the LEO satellite constellation including to change network routing among the plurality of inter-satellite links.

In Example 26, the subject matter of Example 25 optionally includes subject matter where the control of the network communication paths of the LEO satellite constellation relates to: uplink routing, downlink routing, uplink frequency, downlink frequency, or use of fore, aft, right, or left satellite antennas of respective satellite vehicles.

In Example 27, the subject matter of any one or more of Examples 21-26 optionally includes subject matter where the condition is identified based on at least one characteristic indicated in the telemetry data, the at least one characteristic relating to: battery power levels, antenna health, or synchronization state.

In Example 28, the subject matter of any one or more of Examples 21-27 optionally includes subject matter where the condition is identified based on at least one rule for operation of the network communication paths in the LEO satellite constellation, the at least one rule relating to: communication frequency, failure conditions, weather conditions, maintenance calculations, or identified events.

In Example 29, the subject matter of any one or more of Examples 21-28 optionally includes subject matter where the at least one command causes the non-terrestrial NOC to control compute processing operations performed for the LEO satellite constellation, and wherein the compute processing operations are coordinated with a terrestrial data center or a non-terrestrial data center.

In Example 30, the subject matter of any one or more of Examples 21-29 optionally includes subject matter where the non-terrestrial NOC is located in a group of one or more satellites in a second orbital plane that differs from a first orbital plane used by the LEO satellite constellation, and wherein the second orbital plane is a medium Earth orbital plane, geosynchronous orbital plane, or high Earth orbital plane.

Example 31 is an apparatus, comprising respective means for implementing, deploying, or using a multi-orbit data center arrangement as a network operations center, in accordance with Examples 1-30, or the other techniques discussed herein.

Example 32 is a satellite vehicle comprising circuitry for implementing, deploying, or using a multi-orbit data center arrangement as a network operations center, in accordance with Examples 1-30, or the other techniques discussed herein.

Example 33 is a satellite constellation comprising respective satellite vehicles for implementing, deploying, or using a multi-orbit data center arrangement as a network operations center, in accordance with Examples 1-30, or the other techniques discussed herein.

Example 34 is an edge computing system, comprising terrestrial processing equipment configured for implementing, deploying, or using a multi-orbit data center arrangement as a network operations center, in accordance with Examples 1-30, or the other techniques discussed herein.

Example 35 is a network comprising respective devices and device communication mediums for performing any of the operations or techniques in Examples 1-30, or discussed herein.

Example 36 is a system comprising respective components arranged or configured to perform any of the operations or techniques in Examples 1-30, or discussed herein.

Example 37 is a method, performed using specially configured circuitry of a device, arranged or configured to perform any of the operations or techniques in Examples 1-30, or discussed herein.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations that involve terrestrial network connectivity (where available) to increase network bandwidth/throughput and to support additional edge services. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

What is claimed is:

1. A computing system, comprising:
   processing circuitry; and
   a memory device including instructions embodied thereon, wherein the instructions, which when executed by the processing circuitry, configure the processing circuitry to perform operations that:
      obtain, from a low-earth orbit (LEO) satellite constellation, network routing data and telemetry data associated with network communication paths in the LEO satellite constellation, the LEO satellite constellation comprising a plurality of satellite vehicles in orbit that communicate via a plurality of inter-satellite links;
      identify a condition in the telemetry data to change control of the network communication paths of the LEO satellite constellation, the condition relating to usage of the network communication paths as indicated in the network routing data; and
      communicate at least one command to a non-terrestrial network operations center (NOC) that causes the non-terrestrial NOC to control the network communication paths of the LEO satellite constellation, the non-terrestrial NOC located at another satellite vehicle in orbit that is located outside the LEO satellite constellation.

2. The computing system of claim 1, wherein the computing system is implemented as a terrestrial NOC located at a terrestrial data center, and wherein the non-terrestrial NOC is capable to perform operations that were previously performed by the terrestrial NOC.

3. The computing system of claim 2, wherein the at least one command causes the non-terrestrial NOC to take over control of Mission Planning and Scheduling (MPS) operations of the LEO satellite constellation from the terrestrial NOC.

4. The computing system of claim 3, wherein the control of the network communication paths of the LEO satellite constellation is based on MPS routing data provided from the terrestrial NOC to the non-terrestrial NOC.

5. The computing system of claim 1, wherein the at least one command causes the non-terrestrial NOC to control the network communication paths of the LEO satellite constellation including to change network routing among the plurality of inter-satellite links.

6. The computing system of claim 5, wherein the control of the network communication paths of the LEO satellite constellation relates to: uplink routing, downlink routing, uplink frequency, downlink frequency, or use of fore, aft, right, or left satellite antennas of respective satellite vehicles.

7. The computing system of claim 1, wherein the condition is identified based on at least one characteristic indicated in the telemetry data, the at least one characteristic relating to:
   battery power levels, antenna health, or synchronization state.

8. The computing system of claim 1, wherein the condition is identified in the telemetry data based on applying at least one rule for operation of the network communication paths in the LEO satellite constellation, the at least one rule relating to:
communication frequency, failure conditions, weather conditions, maintenance calculations, or identified events.

9. The computing system of claim 1, wherein the at least one command causes the non-terrestrial NOC to control compute processing operations performed for the LEO satellite constellation, and wherein the compute processing operations are coordinated with a terrestrial data center or a non-terrestrial data center.

10. The computing system of claim 1, wherein the non-terrestrial NOC is located in a group of one or more satellites in a second orbital plane that differs from a first orbital plane used by the LEO satellite constellation, and wherein the second orbital plane is a medium earth orbital plane, geosynchronous orbital plane, or high earth orbital plane.

11. A method for configuring satellite networking operations, performed by processing circuitry of a computing device, the method comprising:
obtaining, from a low-earth orbit (LEO) satellite constellation, network routing data and telemetry data associated with network communication paths in the LEO satellite constellation, the LEO satellite constellation comprising a plurality of satellite vehicles in orbit that communicate via a plurality of inter-satellite links;
identifying a condition in the telemetry data to change control of the network communication paths of the LEO satellite constellation, the condition relating to usage of the network communication paths as indicated in the network routing data; and
communicating at least one command to a non-terrestrial network operations center (NOC) that causes the non-terrestrial NOC to control the network communication paths of the LEO satellite constellation, the non-terrestrial NOC located at another satellite vehicle in orbit that is located outside the LEO satellite constellation.

12. The method of claim 11, wherein the method is performed by a terrestrial NOC located at a terrestrial data center, and wherein the non-terrestrial NOC is capable to perform operations that were previously performed by the terrestrial NOC.

13. The method of claim 12, wherein the at least one command causes the non-terrestrial NOC to take over control of Mission Planning and Scheduling (MPS) operations of the LEO satellite constellation from the terrestrial NOC.

14. The method of claim 13, further comprising:
communicating MPS routing data from the terrestrial NOC to the non-terrestrial NOC.

15. The method of claim 11, wherein the at least one command causes the non-terrestrial NOC to control the network communication paths of the LEO satellite constellation including to change network routing among the plurality of inter-satellite links.

16. The method of claim 15, wherein the control of the network communication paths of the LEO satellite constellation relates to: uplink routing, downlink routing, uplink frequency, downlink frequency, or use of fore, aft, right, or left satellite antennas of respective satellite vehicles.

17. The method of claim 11, wherein identifying the condition comprises evaluating at least one characteristic indicated in the telemetry data, the at least one characteristic relating to: battery power levels, antenna health, or synchronization state.

18. The method of claim 11, wherein identifying the condition in the telemetry data comprises applying at least one rule for operation of the network communication paths in the LEO satellite constellation, the at least one rule relating to: communication frequency, failure conditions, weather conditions, maintenance calculations, or identified events.

19. The method of claim 11, wherein the at least one command causes the non-terrestrial NOC to control compute processing operations performed for the LEO satellite constellation, and wherein the compute processing operations are coordinated with a terrestrial data center or a non-terrestrial data center.

20. The method of claim 11, wherein the non-terrestrial NOC is located in a group of one or more satellites in a second orbital plane that differs from a first orbital plane used by the LEO satellite constellation, and wherein the second orbital plane is a medium earth orbital plane, geosynchronous orbital plane, or high earth orbital plane.

* * * * *